(12) United States Patent
Dassenno

(10) Patent No.: US 11,514,191 B2
(45) Date of Patent: Nov. 29, 2022

(54) WEIGHTED SOURCE DATA SECURED ON BLOCKCHAINS

(71) Applicant: eBay Inc., San Jose, CA (US)

(72) Inventor: Fausto Dassenno, London (GB)

(73) Assignee: eBay Inc., San Jose, CA (US)

(*) Notice: Subject to any disclaimer, the term of this patent is extended or adjusted under 35 U.S.C. 154(b) by 218 days.

(21) Appl. No.: 16/943,975

(22) Filed: Jul. 30, 2020

(65) Prior Publication Data

US 2020/0401729 A1 Dec. 24, 2020

Related U.S. Application Data

(63) Continuation of application No. 15/981,595, filed on May 16, 2018, now Pat. No. 10,796,022.

(51) Int. Cl.
| | | |
|---|---|---|
| G06F 21/64 | (2013.01) | |
| H04L 9/32 | (2006.01) | |
| H04L 9/40 | (2022.01) | |
| H04L 9/00 | (2022.01) | |

(52) U.S. Cl.
CPC ............ G06F 21/64 (2013.01); H04L 9/3242 (2013.01); H04L 63/126 (2013.01); *H04L 9/50* (2022.05)

(58) Field of Classification Search
CPC ... G06F 21/64; G06F 21/645; H04L 2209/38; H04L 63/126; H04L 9/3239; H04L 9/3242; H04W 12/00506; H04W 12/1008
See application file for complete search history.

(56) References Cited

U.S. PATENT DOCUMENTS

| | | |
|---|---|---|
| 7,031,932 B1 | 4/2006 | Lipsky et al. |
| 8,832,753 B2 | 9/2014 | Andrade |
| 9,275,171 B2 | 3/2016 | Gross |
| 9,870,591 B2* | 1/2018 | Shah ...................... G06F 40/30 |
| 10,121,025 B1* | 11/2018 | Rice ........................ G06F 21/10 |
| 10,121,115 B2* | 11/2018 | Chrapko .............. G06Q 30/018 |
| 10,250,381 B1* | 4/2019 | Rice .......................... H04L 9/30 |
| 10,482,288 B2* | 11/2019 | Rice ...................... G06F 21/602 |
| 10,537,807 B2* | 1/2020 | Farudi ................... A63F 13/812 |
| 10,554,649 B1* | 2/2020 | Fields ................... H04L 63/105 |

(Continued)

OTHER PUBLICATIONS

Search Query Report from IP.com (performed May 4, 2022) (Year: 2022).*

(Continued)

*Primary Examiner* — Sharon S Lynch
(74) *Attorney, Agent, or Firm* — Shook, Hardy & Bacon LLP

(57) ABSTRACT

Technologies are shown for secure management of evaluation data that involves receiving an evaluation value signal from a source, the evaluation value signal relating to an evaluation entity having an evaluation score secured on an evaluation data blockchain and verifying whether the source is identified in trusted source data. If the source is trusted, then the technology involves obtaining a weight associated with the source, obtaining the evaluation score for the evaluation entity from a first evaluation data block in the evaluation data blockchain, where the first evaluation data block is a most recent evaluation data block in the evaluation data blockchain, calculating a new evaluation score based on the evaluation score obtained from the first evaluation data block and the received valuation signal weighted according to the weight associated with the source, and securely committing the new evaluation score to the evaluation data blockchain in another evaluation data block.

17 Claims, 14 Drawing Sheets

(56) References Cited

U.S. PATENT DOCUMENTS

| | | | |
|---|---|---|---|
| 10,581,882 B2* | 3/2020 | Mehta | G06Q 20/389 |
| 10,796,022 B2 | 10/2020 | Dassenno | |
| 10,810,290 B2* | 10/2020 | Minter | G06F 21/64 |
| 11,102,001 B2* | 8/2021 | Sato | G06Q 20/00 |
| 11,153,073 B2* | 10/2021 | Rice | H04L 9/0637 |
| 2001/0032133 A1 | 10/2001 | Moran | |
| 2001/0051980 A1 | 12/2001 | Raciborski et al. | |
| 2005/0071741 A1 | 3/2005 | Acharya et al. | |
| 2006/0095431 A1 | 5/2006 | Nash | |
| 2006/0149726 A1 | 7/2006 | Ziegert et al. | |
| 2007/0288602 A1 | 12/2007 | Sundaresan | |
| 2008/0015925 A1 | 1/2008 | Sundaresan | |
| 2008/0059215 A1 | 3/2008 | Boyd | |
| 2008/0154717 A1 | 6/2008 | Saifee et al. | |
| 2008/0155623 A1 | 6/2008 | Ota | |
| 2008/0162259 A1 | 7/2008 | Patil et al. | |
| 2008/0235042 A1 | 9/2008 | Boyd et al. | |
| 2009/0013068 A1 | 1/2009 | Eaglestone et al. | |
| 2009/0157490 A1 | 6/2009 | Lawyer | |
| 2009/0327281 A1 | 12/2009 | Young et al. | |
| 2010/0057644 A1 | 3/2010 | Barton et al. | |
| 2010/0179987 A1 | 7/2010 | Sebastian et al. | |
| 2011/0078017 A1 | 3/2011 | Lam et al. | |
| 2013/0144750 A1 | 6/2013 | Brown | |
| 2014/0081965 A1 | 3/2014 | Gross | |
| 2016/0156978 A9 | 6/2016 | Aaron et al. | |
| 2016/0203575 A1 | 7/2016 | Madhu et al. | |
| 2016/0330034 A1* | 11/2016 | Back | G06Q 40/12 |
| 2017/0046652 A1* | 2/2017 | Haldenby | H04L 9/0891 |
| 2017/0161439 A1 | 6/2017 | Raduchel et al. | |
| 2017/0293873 A1* | 10/2017 | Chrapko | G06Q 40/025 |
| 2017/0352027 A1 | 12/2017 | Zhang et al. | |
| 2018/0018723 A1 | 1/2018 | Nagla et al. | |
| 2018/0039942 A1* | 2/2018 | Rogers | H04L 67/108 |
| 2018/0075527 A1* | 3/2018 | Nagla | G06Q 40/025 |
| 2018/0089760 A1* | 3/2018 | Stradling | H04L 9/3236 |
| 2018/0094953 A1* | 4/2018 | Colson | G01D 9/005 |
| 2018/0109541 A1* | 4/2018 | Gleichauf | H04W 12/06 |
| 2018/0227130 A1* | 8/2018 | Ebrahimi | H04L 9/3247 |
| 2018/0227131 A1* | 8/2018 | Ebrahimi | H04L 9/3263 |
| 2018/0253539 A1* | 9/2018 | Minter | G06F 21/64 |
| 2018/0337769 A1* | 11/2018 | Gleichauf | G06Q 20/308 |
| 2018/0345149 A1* | 12/2018 | Farudi | A63B 71/0616 |
| 2019/0122155 A1* | 4/2019 | Irazabal | G06Q 50/01 |
| 2019/0180276 A1* | 6/2019 | Lee | G06Q 20/4016 |
| 2019/0182257 A1* | 6/2019 | Lee | G06Q 10/06315 |
| 2019/0236559 A1* | 8/2019 | Padmanabhan | G06F 21/44 |
| 2019/0236562 A1* | 8/2019 | Padmanabhan | G06Q 20/0655 |
| 2019/0236598 A1* | 8/2019 | Padmanabhan | G06N 20/00 |
| 2019/0236606 A1* | 8/2019 | Padmanabhan | G06Q 20/401 |
| 2019/0238316 A1* | 8/2019 | Padmanabhan | H04L 9/0637 |
| 2019/0238525 A1* | 8/2019 | Padmanabhan | H04L 63/08 |
| 2019/0258828 A1* | 8/2019 | Rice | G06F 21/602 |
| 2019/0266612 A1* | 8/2019 | McHale | G06Q 30/0185 |
| 2019/0287182 A1* | 9/2019 | Chetal | G06Q 40/12 |
| 2019/0306176 A1* | 10/2019 | Gleichauf | H04W 12/10 |
| 2019/0319968 A1* | 10/2019 | Mehta | G06Q 20/36 |
| 2019/0333029 A1* | 10/2019 | Kravitz | G06Q 20/401 |
| 2019/0333031 A1* | 10/2019 | Kravitz | G06Q 20/4016 |
| 2019/0349185 A1* | 11/2019 | Kim | H04L 9/0637 |
| 2019/0354723 A1 | 11/2019 | Dassenno | |
| 2020/0021439 A1* | 1/2020 | Sato | G06Q 20/00 |
| 2020/0021598 A1* | 1/2020 | Lee | H04W 4/35 |
| 2020/0027085 A1* | 1/2020 | Lee | H04L 63/10 |
| 2020/0044828 A1* | 2/2020 | Rice | H04L 9/0637 |
| 2020/0133955 A1* | 4/2020 | Padmanabhan | H04L 63/123 |
| 2020/0134656 A1* | 4/2020 | Padmanabhan | H04L 63/123 |
| 2022/0038261 A1* | 2/2022 | Rice | H04L 9/3239 |

OTHER PUBLICATIONS

Search Query Report from IP.com (performed Sep. 2, 2022) (Year: 2022).*

Advisory Action Received for U.S. Appl. No. 12/569,669, dated Aug. 7, 2020, 3 Pages.
Applicant Interview summary received for U.S. Appl. No. 12/569,669,dated Jul. 20, 2020, 3 pages.
Response to Final Office Action filed on Aug. 13, 2020 for U.S. Appl. No. 12/569,669, dated May 29, 2020, 11 pages.
Response to Final Office Action filed on Jul. 29, 2020 for U.S. Appl. No. 12/569,669, dated May 29, 2020, 11 pages.
Notice of Allowance received for U.S. Appl. No. 15/981,595, dated Jul. 13, 2020, 21 Pages.
Notice of Allowance received for U.S. Appl. No. 15/981,595, dated May 13, 2020, 24 pages.
Response to Final Office Action filed on Dec. 22, 2017 for U.S. Appl. No. 12/569,669, dated Aug. 22, 2017, 11 pages.
U.S. Appl. NO. 15/981,595, filed May 16, 2018.
Non-Final Office Action Received for U.S. Appl. No. 12/569,669, dated Dec. 17, 2020, 20 Pages.
Triantafyllidis, "Developing an Ethereum Blockchain Application", University of Amsterdam System and Network Engineering, MSc, http://www.delaat.net/rp/2015-2016/p53/report.pdf, Feb. 19, 2016, 59 pages.
Search Query Report from IP.com, Performed May 6, 2020, 4 pages.
Search Query Report from IP.com, Performed Jul. 1, 2020, 4 pages.
Szabo,"Smart Contracts: Building Blocks for Digital Markets", Alamut Bastion of Peace and Information, Copyright (c) 1996, http://www.alamut.com/subj/economics/nick_szabo/smartContracts.html, 1996, 18 pages.
Applicant Interview summary received for U.S. Appl. No. 12/569,669, dated Feb. 4, 2020, 3 pages.
Ramachandran et al., "Using Blockchain and Smart Contracts for Secure Data Provenance Management", Sep. 28, 2017, 11 pages.
Applicant Initiated Interview Summary Received For U.S. Appl. No. 12/569,669, dated Feb. 26, 2019, 3 pages.
Applicant Initiated Interview Summary Received for U.S. Appl. No. 12/569,669 dted May 12, 2020, 3 Pages.
Applicant-Initiated Interview Summary Received for U.S. Appl. No. 12/569,669, dated Aug. 22, 2019, 3 pages.
Final Office Action received for U.S. Appl. No. 12/569,669, dated Aug. 22, 2017, 25 Pages.
Final Office Action received for U.S. Appl. No. 12/569,669, dated Dec. 18, 2018, 28 pages.
Final Office Action received for U.S. Appl. No. 12/569,669, dted Jan. 18, 2013, 14 pages.
Final Office Action received for U.S. Appl. No. 12/569,669, dated Sep. 30, 2015, 24 pages.
Final Office Action Received for U.S. Appl. No. 12/569,669 dated May 29, 2020, 20 pages.
Final Office Action Received for U.S. Appl. No. 12/569,669, dated Oct. 11, 2019, 22 pages.
Non Final Office Action Received for U.S. Appl. No. 12/569,669, dated Apr. 2, 2020, 18 pages.
Non-Final Office Action received for U.S. Appl. No. 12/569,669, dated Apr. 17, 2017, 23 pages.
Non-Final Office Action received for U.S. Appl. No. 12/569,669, dated Aug. 13, 2018, 31 pages.
Non-Final Office Action received for U.S. Appl. No. 12/569,669, dated Jul. 15, 2019, 26 pages.
Non-Final Office Action received for U.S. Appl. No. 12/569,669, dated May 13, 2015, 17 pages.
Non-Final Office Action received for U.S. Appl. No. 12/569,669, dated Sep. 4, 2012, 13 pages.
Paper, "A Next-Generation Smart Contract and Decentralized Application Platform", Retrieved from the Internet <https://github.com/ethereum/wiki/wiki/White-Paper/f18902f4e7fb21dc92b37e8a0963eec4b3f4793a>, 2017, 26 pages.
Response to Final Office Action filed on Apr. 8, 2013 for U.S. Appl. No. 12/569,669, dated Jan. 18, 2013, 12 pages.
Response to Final Office Action filed on Dec. 30, 2015 for U.S. Appl. No. 12/569,669, dated Sep. 30, 2015, 13 pages.
Response to Final Office Action filed on Jan. 13, 2020 for U.S. Appl. No. 12/569,669, dated Oct. 11, 2019, 12 pages.

(56) References Cited

OTHER PUBLICATIONS

Kehrli, "Blockchain explained", Retrieved from the Internet URL: <https://www.niceideas.ch/blockchain_explained_pdf>, Oct. 7, 2016, 25 pages.
Response to Final Office Action filed on Mar. 18, 2019, for U.S. Appl. No. 12/569,669, dated Dec. 18, 2018, 17 pages.
Response to Non-Final Office Action filed on Jan. 4, 2013, for U.S. Appl. No. 12/569,669, dated Sep. 4, 2012, 13 pages.
Response to Non-Final Office Action filed on Jul. 17, 2017, for U.S. Appl. No. 12/569,669, dated Apr. 17, 2017, 13 pages.
Response to Non-Final Office Action Filed on May 21, 2020, for U.S. Appl. No. 12/569,669, dated Apr. 2, 2020, 11 pages.
Response to Non-Final Office Action filed on Nov. 13, 2018, for U.S. Appl. No. 12/569,669, dated Aug. 13, 2018, 18 pages.
Response to Non-Final Office Action Filed on Oct. 1, 2019, for U.S. Appl. No. 12/569,669, dated Jul. 15, 2019, 18 Pages.
Response to Non-Final Office Action filed on Sep. 9, 2015, for U.S. Appl. No. 12/569,669, dated May 13, 2015, 18 pages.
Chen et al., "Under-Optimized Smart Contracts Devour Your Money", Retrieved from the Internet: <https://arxiv.org/pdf/1703.03994.pdf>, Mar. 2017, 5 pages.
Chainfrog, "What are Smart Contracts?", Retrieved from the Internet: <http://www.chainfrog.com/wp-content/uploads/2017/08/smart-contracts_pdf>, Aug. 2017, 13 pages.

\* cited by examiner

```
EVALUATION DATA BLOCK

METHODS
Evaluation(source ID, evaluation signal value, Score) /* Called by
client/server source providing evaluation signal */
{
        validate(source ID)
        if(validate == TRUE)
                Score=calcAlgo(evaluation signal value,
                        weight, Score)
        addScore(source ID, Score)
} validate(source ID) /* Search Trusted Source Blockchain for most
recent entry pertaining to the source identified by source ID and
get source weight */
{
        found = search_on_trusted_source_blockchain(source ID)
        if(found == TRUE)
                return(TRUE)
                return(weight)
}
```

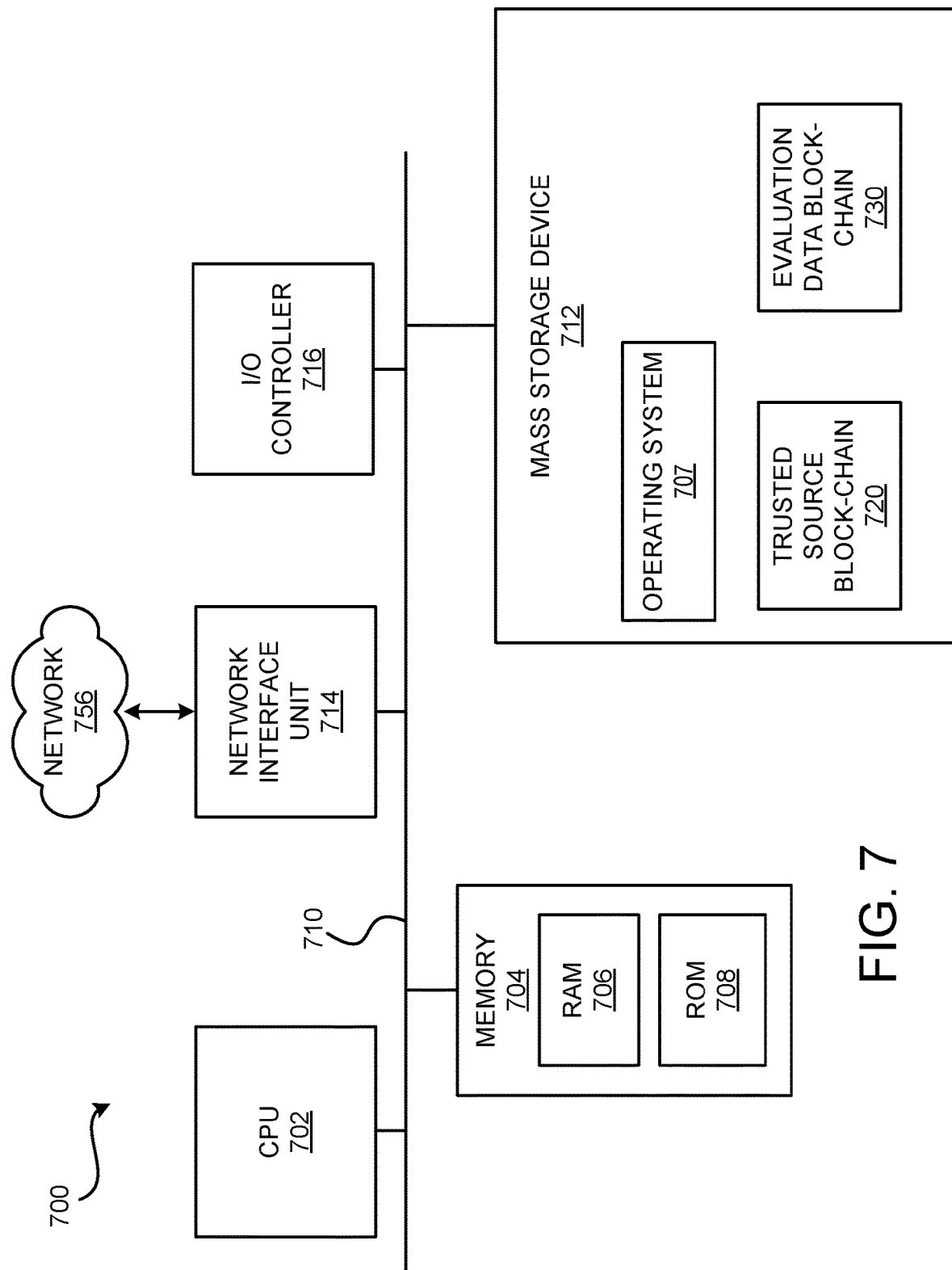

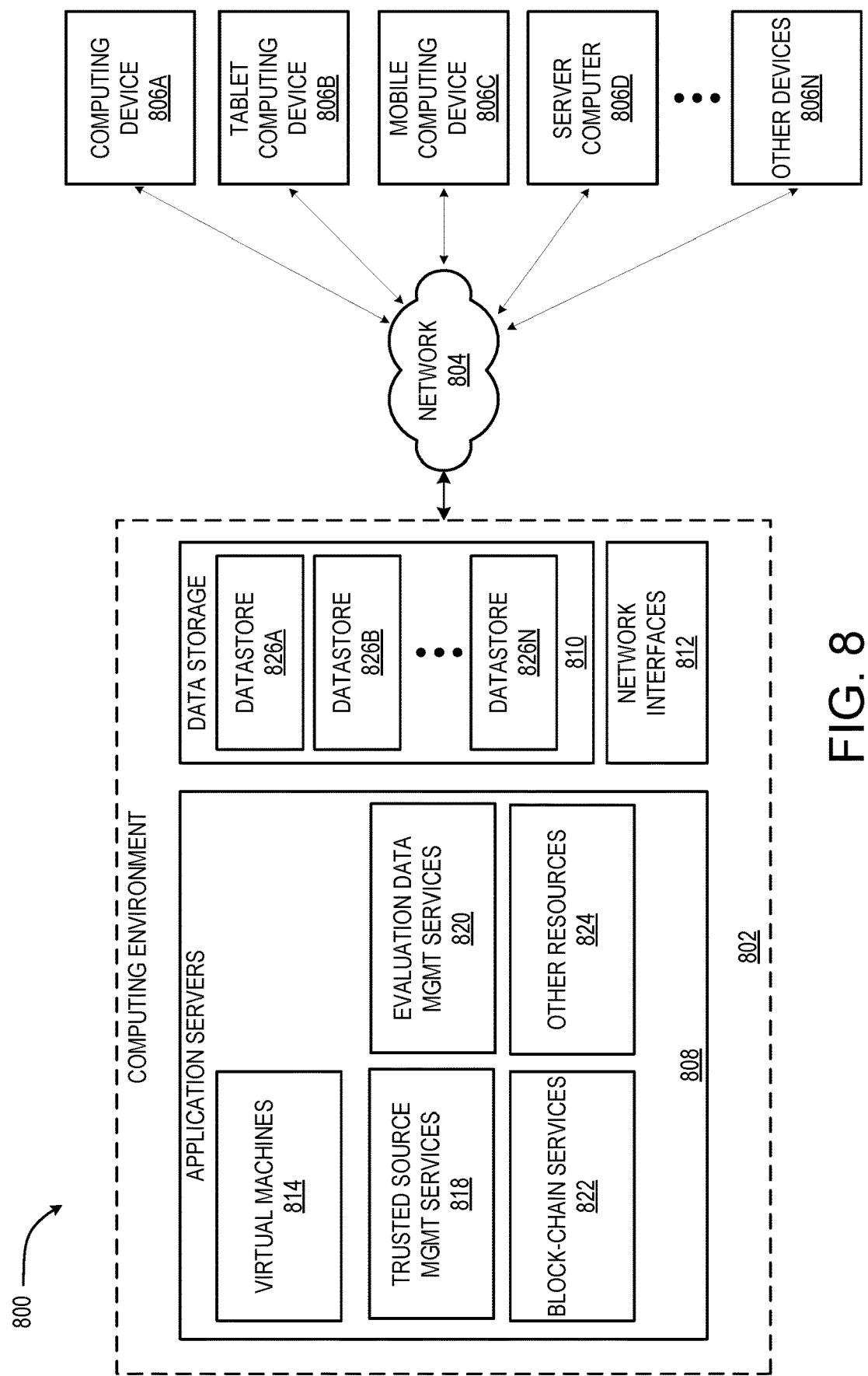

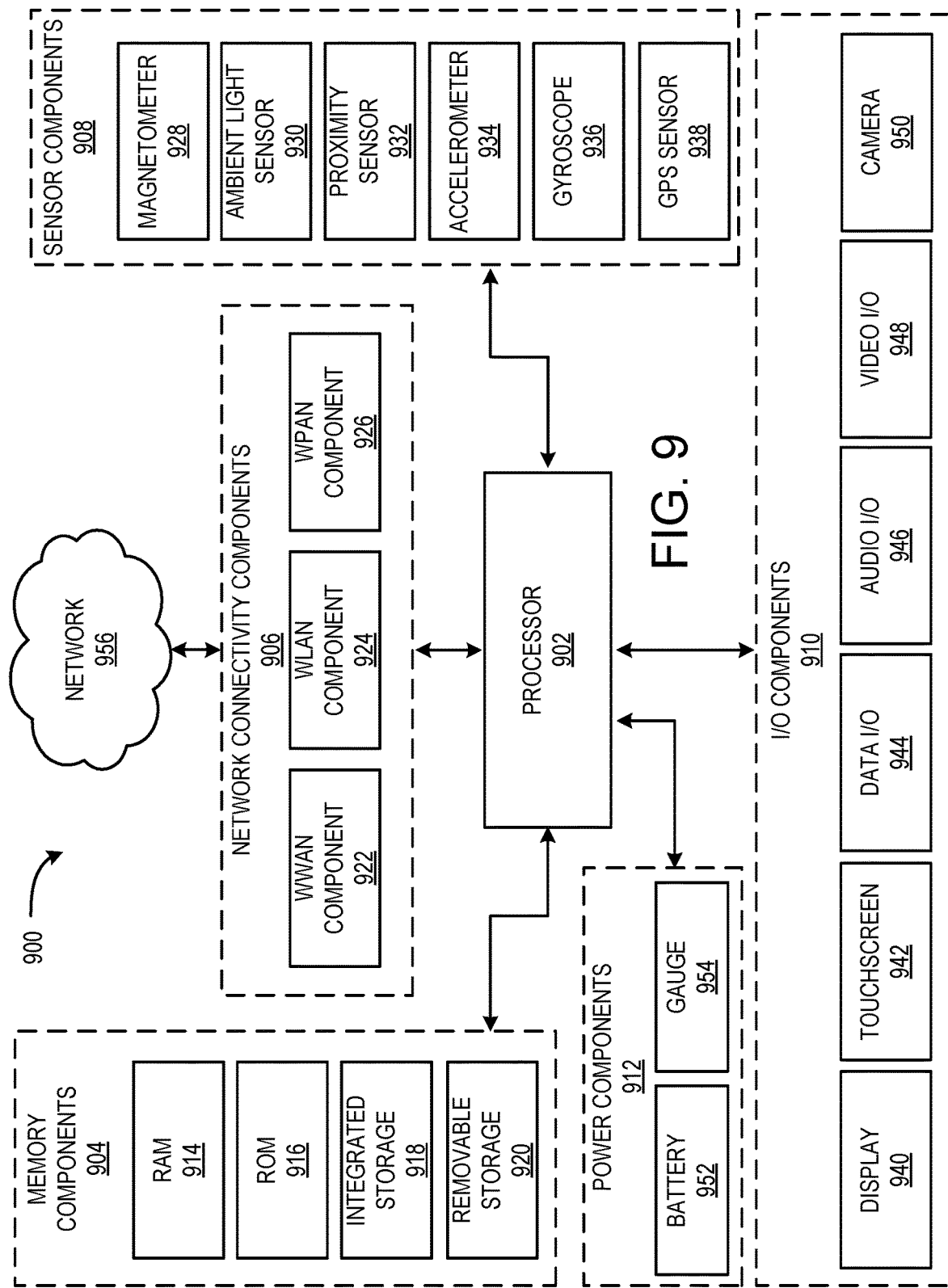

WEIGHTED SOURCE DATA SECURED ON BLOCKCHAINS

CROSS REFERENCE TO RELATED APPLICATIONS

This application claims the benefit of U.S. patent application Ser. No. 15/981,595 for "Weighted Source Data Secured on Blockchains" filed May 16, 2018, herein incorporated by reference in its entirety for all purposes.

BACKGROUND

Evaluation data, such as reputation or quality data, pertaining to an entity is highly useful in assessing the reliability of the entity. For example, reputation systems generally allow members of online communities to rate other members of the community. Some communities allow members to provide ratings for providers, such as restaurants. Also, many service providers obtain rating input from the users of their services. Frequently, online market places collect evaluation data from purchasers of products or services.

The reputation or evaluation data provided by reputation or evaluation systems is valuable in building trust among users of online communities. Reliable evaluation data can help users develop accurate expectations of future interactions. Evaluation scores, for instance, may provide guidance for users in determining their future purchasing decisions.

However, maintaining and accessing reputation or evaluation data is often controlled using internal systems that provide little or no transparency on how the data is collected and inhibits the traceability of inputs to the evaluation data. Further, the way evaluation scores are determined and the sources of the evaluation data entering into the scores are typically not transparent.

It is with respect to these and other considerations that the disclosure made herein is presented.

SUMMARY

The disclosed technology is directed toward an evaluation system that is reliable, transparent and traceable. In one aspect of the technology, a trusted source list is maintained on a blockchain on which each trusted source is identified along with an associated weight for the trusted source. The varying weights associated with different trusted sources allows some trusted sources, e.g. government inspectors, law enforcement, governmental entities, or banks, to have greater influence on reputation or evaluation scores. Trusted sources are validated using the trusted source blockchain and the corresponding weight used to determine an evaluation score. By maintaining the sources of the weighted trust signals, their corresponding weights and the code for determining the evaluation score on a blockchain, this information can be made available to users so that they have visibility into the evaluation process.

Another aspect of the disclosed technology involves storing the evaluation score on the same or another blockchain such that the evaluation score data is authenticated and stored on the blockchain such that the evaluation score is reliable and traceable. Also, the trust signal inputs from the trusted sources can be maintained on the same or another blockchain so that the evaluation data from the trust signal inputs so that the data is authenticated on the blockchain and traceable for transparency and reliability.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 3B is a data architecture diagram showing an illustrative example of an evaluation block that includes validation and evaluation code for an evaluation transaction on the evaluation blockchain;

FIG. 7 is a computer architecture diagram illustrating an illustrative computer hardware and software architecture for a computing system capable of implementing aspects of the techniques and technologies presented herein;

FIG. 8 is a diagram illustrating a distributed computing environment capable of implementing aspects of the techniques and technologies presented herein; and FIG. 9 is a computer architecture diagram illustrating a computing device architecture for a computing device capable of implementing aspects of the techniques and technologies presented herein.

DETAILED DESCRIPTION

Figure 1:
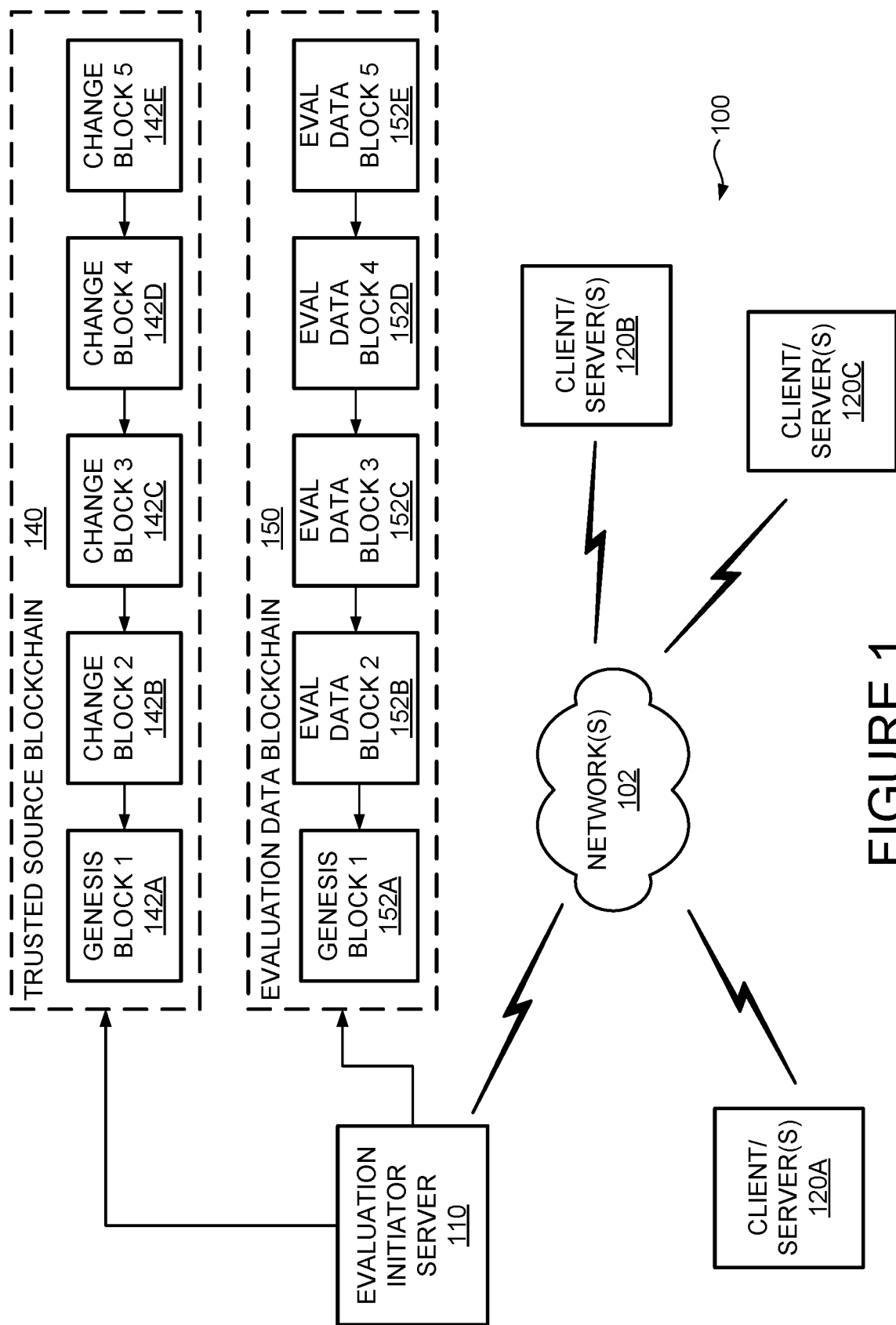
FIG. 1 is an architectural diagram showing an illustrative example of a system for a trusted source blockchain and an evaluation data blockchain.

The following Detailed Description describes technologies for the use of blockchaining in in evaluation data management system that maintains a list of trusted sources with corresponding weights secured on a trusted source blockchain and utilizes the trusted sources and weights in determining evaluation scores in an evaluation data blockchain based on an evaluation value signal from a source entity.

Evaluation data is securely maintained on a blockchain. A list of trusted sources and a weight value associated with each trusted source is maintained in a trusted source list blockchain. Evaluation data, e.g. reputation data or quality data, is maintained for an evaluation entity, e.g. a user account, on an evaluation data blockchain. Source entities that are maintained in the trusted source list blockchain may modify an evaluation score for an evaluation entity in accordance with the weight associated with the source entity. A technical advantage of use of a blockchain includes security of the data, which therefore insures accuracy of the final evaluation data.

Conventionally, evaluation data pertaining to entities under evaluation, e.g. documents, parts, vehicles, products or services, is maintained in proprietary systems of an entity that initiates evaluation. The way the evaluation data is maintained, how an evaluation score is determined, and the sources for the information used to determine an evaluation score are not typically available to entities outside of the entity that initiates the evaluation or a limited portion of this information is available. Transparency for this information can increase the level of trust in the evaluation data on the part of those who rely on the evaluation data. On the other hand, evaluation information that is made accessible to the public can expose the information to a risk of degradation from parties that are malicious or have an interest in altering the evaluation data or score.

Further, the different sources for evaluation data are often accorded the same influence on the evaluation score. However, different sources may provide information that has differing levels of quality. The evaluation input from a source with a relatively low level of knowledge or authority as to an entity under evaluation is of lower quality or value than evaluation input from a source with a high level or knowledge or authority regarding the entity under evaluation. Giving equal weight to the evaluation input from these different sources reduces the influence of knowledge or authority on an evaluation score for the entity under evaluation.

The disclosed technology can provide transparency, traceability and security for the information and processes used in collecting and maintaining evaluation data. A trusted source blockchain is utilized to maintain a list of trusted source entities who can provide evaluation input data along with a relative weighting for each trusted source entity. An evaluation data blockchain receives evaluation input data from sources and utilizes the trust source blockchain to validate that the source providing the evaluation input data is a trusted source. The evaluation data blockchain also utilizes the relative weighting for a trusted source along with the evaluation input data from the trusted source and a pre-existing evaluation score in determining a new evaluation score. By employing relative weights, a technical advantage is an evaluation score may be calculated with more granularity and data accuracy.

In certain simplified examples, a method, system or computer readable medium for secure management of evaluation data involves receiving an evaluation value signal from a source entity, the evaluation value signal relating to an evaluation entity having an evaluation score secured on an evaluation data blockchain and verifying whether the source entity is identified in trusted source data. If the source entity is identified in trusted source data, the disclosed technology continues by obtaining a weight associated with the source entity, obtaining the evaluation score for the evaluation entity from a first evaluation data block in the evaluation data blockchain, where the first evaluation data block is a most recent evaluation data block in the evaluation data blockchain, calculating a new evaluation score based on the evaluation score obtained from the first evaluation data block and the received valuation signal weighted according to the weight associated with the source entity, and securely committing the new evaluation score to the evaluation data blockchain in another evaluation data block.

In some examples, the technology includes securing the trusted source data in a trusted source blockchain. These examples involve defining entries for one or more source entities in trusted source data secured on a trusted source blockchain, where a weight is associated with each source entity in the entry for each source entity. The operation of verifying whether the source entity is identified in trusted source data involves searching the trusted source blockchain for an entry corresponding to the source entity. The operation of obtaining a weight associated with the source entity comprises obtaining a weight associated with the source entity from the entry corresponding to the source entity.

In other examples, the disclosed technology involves defining another entry for an additional source entity in a change data block and committing the change data block to the trust source blockchain. Some examples involve modifying one of the entries for the one or more source entities on a trusted source blockchain in a change data block and committing the change data block to the trust source blockchain.

In still other examples, script code is contained with the evaluation data blocks such that the script code is also secured on the evaluation data blockchain. For instance, each of the first and second evaluation data blocks includes a first executable script that, when executed, performs the step of searching the trusted source blockchain for an entry corresponding to the source entity. In additional examples, each of the first and second evaluation data blocks includes a second executable script that, when executed, performs the step of calculating a new evaluation score based on the evaluation score obtained from the first evaluation data block and the received valuation signal weighted according to the weight associated with the source entity.

Another feature of disclosed technology provides for assigning different weight values to different source entities.

In one example, a first entry for a first source entity of the one or more source entities defines the first source entity with a first weight. A second entry for a second source entity of the one or more source entities defines the second source entity with a second weight. And the first weight value is greater than the second weight value. In some examples with this feature, the first source entity corresponds to one of a law enforcement agency, a government agency with inspection authority, or a government agency with licensing authority. In other examples, a third entry for a third source entity of the one or more source entities defines the third source entity with a third weight value, where the first weight value is greater than the third weight value and the third weight value is greater than the second weight value.

Another example of the disclosed technology includes a feature for obtaining an evaluation score from the evaluation data blockchain for a requestor. This example involves receiving a request for the evaluation score from a requestor and verifying that the requestor is authorized to access the evaluation score by obtaining access data associated with the evaluation score from the blockchain and determining whether the access data indicates that the requestor is authorized to access the evaluation score. If the requestor is authorized to access the evaluation score, obtain the evaluation score from the blockchain and providing the evaluation score to the requestor.

Another example of the disclosed technology includes a feature for working with data and smart contract code included in two separate blockchains. As just one example, an intermediate computing node may intermediate trusted messages between a trusted source blockchain and an evaluation data blockchain. Although an example type of data includes evaluation and trusted source data, the two blockchains may include any kinds of data—for example, one blockchain may include financial data and another data may include personnel data. The two blockchains may be based on the same technology or different technology, and each blockchain may employ different scripting languages. A technical advantage of the disclosed technology includes the ability to work across a disparate set of blockchains, each blockchain including valuable data and smart contract logic to be used in final calculations, yet allowing for resulting data using smart contracts and data from all of the types of blockchain. By configuring the blockchains according to the disclosed technology, a technical advantage includes computation of the most accurate results because data from disparate blockchain sources may be combined.

Particular examples for the evaluation entity that is the subject of the evaluation data blockchain include a user, a service, an aircraft, an aircraft assembly, a vehicle, a vehicle assembly, a lot of a commodity or food stuff, a document, and a manufactured product.

These are simplified examples and many factors may be considered in a system for maintaining evaluation data using a blockchain as will be discussed in greater detail below.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of evaluation data, trusted sources, weight values of trusted sources, or other information pertaining to the evaluation data or trusted source list.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

By the use of the technologies described herein, an evaluation data blockchain is used to maintain evaluation data pertaining to an evaluation entity. In addition, a trusted source blockchain is used to maintain trusted source data identifying source entities that are permitted to submit evaluation value signals to the evaluation data blockchain. The evaluation data blockchain accesses the trusted source blockchain to validate that a source entity is defined as a trusted source and obtain a weight value associated with the source entity. An evaluation score for the evaluation entity is based on a previous evaluation score, the evaluation value signal from the source entity, and the weight value of the source entity. Code for validating trusted sources and determining the evaluation score may be included in the evaluation data blocks of the evaluation data blockchain. Other technical effects other than those mentioned herein can also be realized from implementation of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for trusted source and evaluation data blockchain ledgers will be described. As will be described in more detail below with respect to the figures, there are a number of applications and services that may embody the functionality and techniques described herein.

FIG. 1 is an architectural diagram showing an illustrative example of an evaluation data management system 100 utilizing a trusted source blockchain 140 to securely maintain data identifying trusted sources that are permitted to provide evaluation data signals to determine evaluation scores that are maintained in an evaluation data blockchain 150. In FIG. 1, two separate blockchains are employed, including trusted source blockchain 140 and evaluation data blockchain 150. Evaluation initiation server 110 may intermediate messages and signals between the blockchains 140 and 150. In the embodiment of FIG. 1, the blockchains 140 and 150 may be of the same type, such as based on ETHEREUM, but they may also be of different types—as just one example, blockchain 140 may be based on the script language for BITCOIN, called SCRIPT and the blockchain 150 may be based on a scripting language for ETHEREUM, such as SOLIDIFY.

An evaluation initiator server 110 initiates trusted source blockchain 140 by creating genesis block 142A and initiates evaluation data blockchain 150 by creating genesis block 152A. Genesis block 142A can include data identifying one or more trusted sources that are permitted to submit evaluation data to evaluation data blockchain 150 along with a relative weight value for each source. Genesis block 152A can include an initial evaluation score for an entity for which evaluation data is maintained in evaluation blockchain 150. In other embodiments, the evaluation initiator server 110 may be replaced by another computing node, such as a computer on a peer-to-peer network, or other computing device.

In the example of FIG. 1, the information in trusted source blockchain 140 provides a source identifier and weight value for each of the one or more of client/servers 120A, 120B or 120C that are trusted sources for evaluation data blockchain 150. The client/servers 120 can communicate with evaluation initiator server 110 as well as a network of servers that support and maintain blockchains 140 and 150. For example, the ETHERIUM blockchain platform from the ETHERIUM FOUNDATION of Switzerland provides a decentralized, distributed computing platform and operating system that provides scripting functionality.

Evaluation initiator server 110 controls the trust source data in trusted source blockchain 140 and can revise the trusted source data by submitting new or revised trusted source data in change blocks 142B, 142C, 142D and 142E in this example. Though evaluation initiator server 110 maintains control over changes to the trusted source data blockchain 140, the trust source data can be made accessible to other entities. For example, trusted source data blockchain 140 may be viewable to the public through the use of applications that can access blockchain information. Or, in another example, the trusted source data blockchain 140 may be restricted to being viewable only to client/servers 120 that are identified as trusted sources in blockchain 140. By providing access to the trusted source data blockchain 140, this approach can provide full or partial transparency to the identity of the trusted sources along with the relative weight value of each source.

Figure 2A:
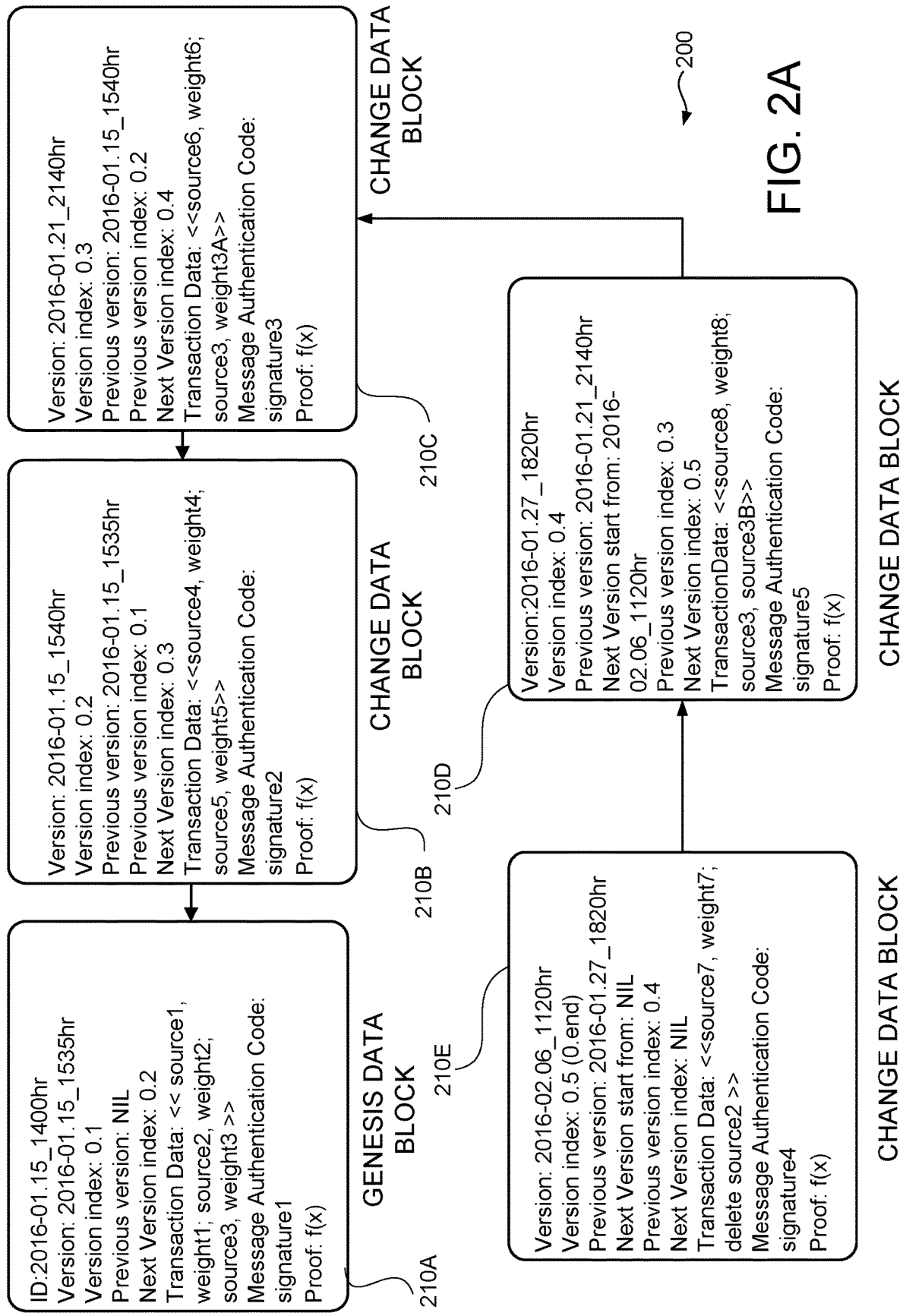
FIG. 2A is a data architecture diagram showing an illustrative example of a trusted source blockchain with sources and weightings being added to the trusted source data or being modified and the changes are secured with a new change block on the blockchain.

FIG. 2A is a data architecture diagram illustrating a simplified example of a trusted source blockchain ledger 200 based on the blocks 142A-E of the trusted source blockchain ledger 140 of FIG. 1. The trusted source blockchain ledger 200 example of FIG. 2A is simplified to show block headers, metadata and signatures of blocks 210A-E in order to demonstrate a traceable secure trusted source list using a blockchain. In outline, a blockchain ledger may be a globally shared transactional database.

The blockchain ledger 200 may be arranged as a Merkle tree data structure, as a linked list, or as any similar data structure that allows for cryptographic integrity. The blockchain ledger 200 allows for verification that data has not been corrupted or tampered with because any attempt to tamper will change a Message Authentication Code (or has) of a block, and other blocks pointing to that block will be out of correspondence. In one embodiment of FIG. 2A, each block may point to another block. A block may comprise one or more transactions. Each block may include a pointer to the other block, and a hash (or Message Authentication Code function) of the other block.

Each block in the blockchain ledger may optionally contain a proof data field. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate 10*10=100 time units have accrued. A proof of research may indicate that research has been performed. In one example, a proof of research may indicate that a certain amount of computational work has been performed—such as exploring whether molecules interact a certain way during a computational search for an efficacious drug compound.

The blocks 210 of trusted source blockchain 200 in the example of FIG. 2A shows sources and weight values being added to the trusted source data or being modified and the changes are secured with a new change block on the blockchain. In this example, evaluation initiator server 110 of FIG. 1 identifies three trust source entities, e.g. source1, source2 and source 3, and their corresponding weight values, e.g. weight1, weight2 and weight3, when it creates genesis data block 210A. The evaluation initiator server 110 signs the genesis block 210A and the blockchain system within which blockchain 200 is created verifies the genesis data block based on a proof function.

To modify the trusted source data blockchain 200, evaluation initiator server 110 creates change data block 210B, which adds two additional sources, source 4 and source 5, with their corresponding weight values, weight4 and weight5. The evaluation initiator server 110 signs change data block 210B and commits the block to blockchain 200 for verification by the blockchain platform. Similarly, evaluation initiator server 110 creates change data block 210C to add source6 with weight6 and to modify the weight value of source3 to a new weight value weight3A. Likewise, change data block 210D is created to added source 8 with weight8 and to modify the weight value of source3 to yet another new weight value weight3B. Further, change data block 210E is created to introduce source7 with weight1 and to delete source2 as a trusted source. In this approach the overall list of trusted data sources is obtained by tracing the change data blocks back to the genesis data block 210A for the trusted source blockchain 200.

Figure 2B:
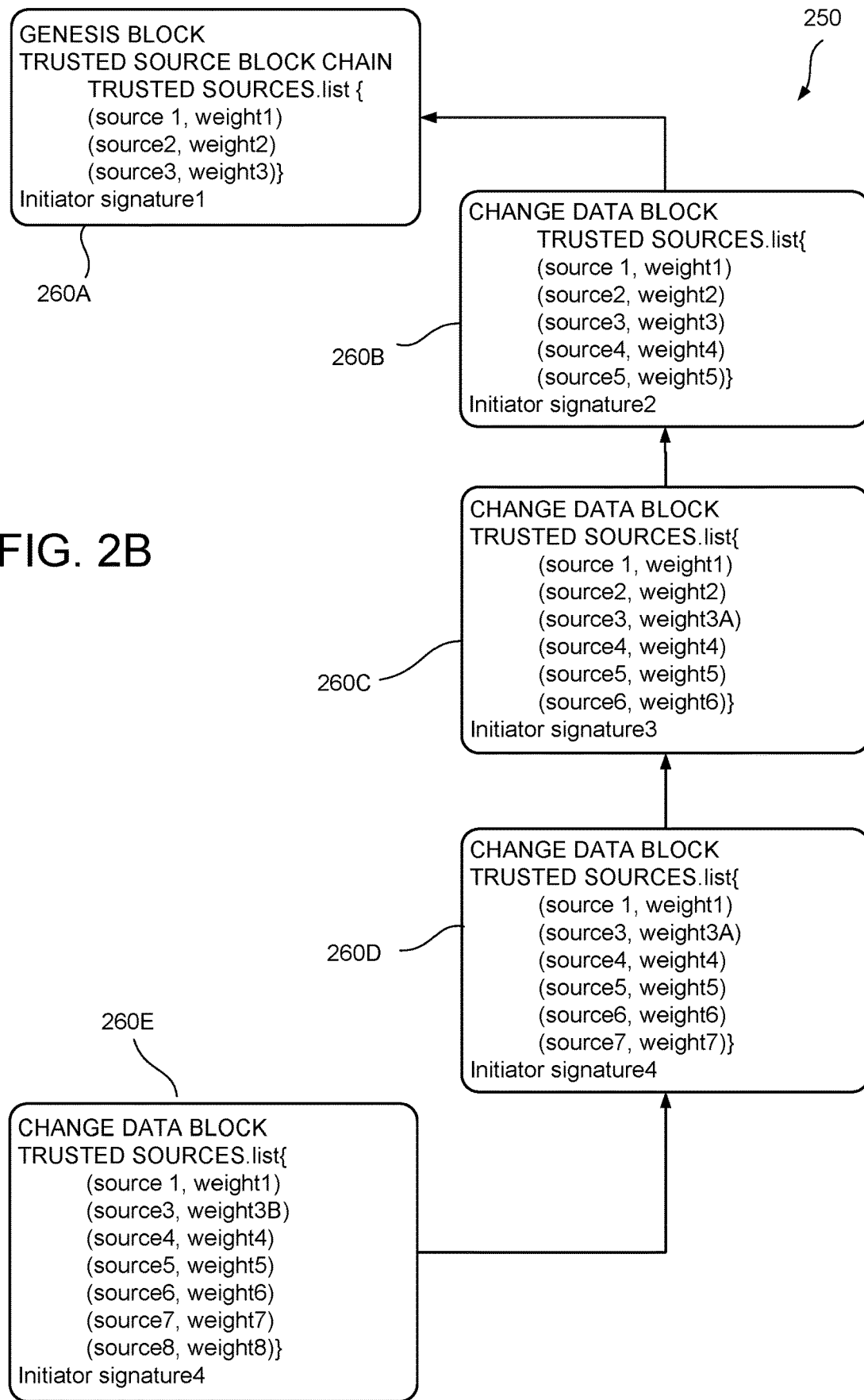
FIG. 2B is a data architecture diagram showing another illustrative example of a trusted source blockchain where each block on the blockchain includes a complete list of trusted sources and weights.

FIG. 2B is a data architecture diagram showing another illustrative example of a trusted source blockchain 250 that takes a different approach wherein each data block 260 on the blockchain 250 includes a complete list of trusted sources and weight values. In this approach, the list of trusted sources identified in genesis block 260A is: (source1, weight1); (source2, weight2); and (source3, weight3).

To add sources to the trusted source list, evaluation initiator server 110 creates change data block 260B, which adds two sources by listing: (source1, weight1); (source2, weight2); (source3, weight3); (source4, weight4); and (source5, weight5). Change data block 260C modifies the weight of source3 to weight3A, e.g. (source3, weight3A) in the list, and adds (source6, weight6). Similarly, change data block 260D removes source2 as a trusted source by removing it from the list and adds (source7, weight7). Finally, change data block 260E modifies the weight value for source3, e.g. (source3, source3B), and adds (source8, weight8). Each of the data blocks 260 is signed by the evaluation initiator server 110 and committed to the blockchain 250 for verification by the blockchain platform.

Generally, the approach of FIG. 2A requires more computation resources while the approach of FIG. 2B utilizes more data storage resources. A variety of approaches may be utilized that are consistent with the present approach.

Figure 3A:
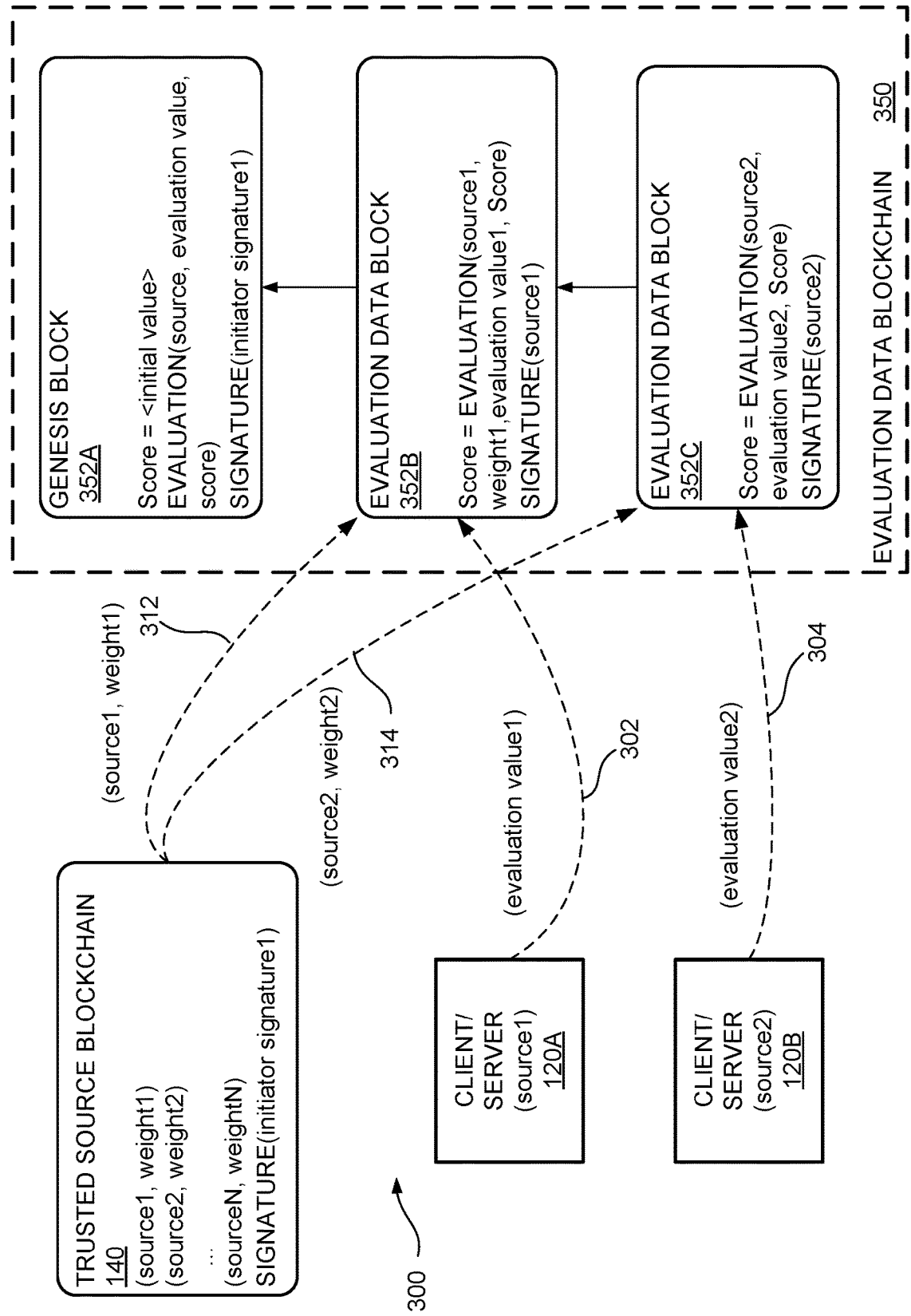
FIG. 3A is a data architecture diagram showing an illustrative example of an evaluation blockchain ledger with evaluation data from source entities being validated and valid evaluation data secured on the blockchain.

The trust source data from the trusted source blockchain 140 is utilized in validating evaluation signals and determining an evaluation score for an entity being evaluation. FIG. 3A is a data architecture diagram showing an illustrative example of an evaluation blockchain ledger with evaluation data from source entities being validated and valid evaluation data secured on the blockchain. In this example, client/server entity 120A is identified as source1 and client/ server entity 120B is identified as source2 in trusted source blockchain 140. In this illustrative scenario, each of the client/server entities 120 submits an evaluation value signal to evaluation data blockchain 150.

Genesis block 352A is created by evaluation initiator server 110 to maintain evaluation data for an entity being evaluated, e.g. a document, a system, a service, etc. The genesis block 352A includes an initial value for an evaluation score, e.g. Score, along with an EVALUATION script that validates the source of an evaluation signal and calculates a new value for the Score based on the evaluation signal and a weight value for the source. Evaluation initiator server 110 signs genesis block 352A and it is verified by the blockchain platform.

To submit an evaluation signal, client/server 120A initiates evaluation data block 352B with message 302 containing its source identifier, source1, and evaluation value1. The EVALUATION script is invoked within evaluation data block 352B and attempts to obtain the source and weight data for source1 from trusted source blockchain 140, e.g. (source1, weight1) 312. Because source1 is listed in the trusted source data, the EVALUATION script will calculate a new evaluation Score based on evaluation value1 from source1, weight1 and the old evaluation Score that was initialized to an initial value in genesis block 352A. Source1 signs evaluation data block 352B, which includes the new value for Score, and the evaluation data block 352B is committed to the evaluation data blockchain 350. Note that if source1 was not identified in trusted source blockchain 140 as a trusted source, then evaluation value1 would have been rejected by the EVALUATION script.

Subsequently, client/server 120B initiates evaluation data block 352C with message 304 containing its source identifier, source2, and evaluation value2. The EVALUATION script is invoked in evaluation data block 352C and obtains the trusted source information for source2 from trusted source blockchain 140, e.g. (source2, weight2) 314. Similar to source1, if source2 is identified in trusted source blockchain 140, then evaluation value2, weight2, and the Score value recorded in evaluation data block 352B are utilized to calculate a new value for Score, which is recorded in evaluation data block 352C when it is committed to the evaluation data blockchain 350.

The EVALUATION script is secured by the evaluation data blockchain executed by the operating system of the decentralized, distributed blockchain platform. FIG. 3B is a data architecture diagram showing an illustrative example of an evaluation data block 352 that includes validation and evaluation code for an evaluation transaction on the evaluation blockchain.

In this example, the Evaluation script is called by the client/server 120 that is the source providing the evaluation signal, with the source ID of the calling source, the evaluation value from the source and the old value for Score. The Evaluation script calls a validate script with the source ID, which searches the trusted source blockchain 140 for the most recent entry pertaining to the source identified by the source ID and, if an entry for the source ID is found, also obtains the source weight value. If the validate script finds an entry for the source ID, it returns TRUE and the source's weight value from the trusted source blockchain.

If the validate script returns TRUE, then the Evaluation script calculates a new value for Score based on the evaluation signal value from the source, the weight of the source, and the old value for Score. The new value for Score is then added to the evaluation data blockchain and verified by the distributed blockchain platform. In this approach, both the manner in which an evaluation score is determined, e.g. the input data and code, as well as the evaluation score itself can be securely stored and maintained on the evaluation data blockchain 350. Further, this evaluation information can be made fully or partially accessible for viewing in order to provide transparency to the information.

Figure 4A:
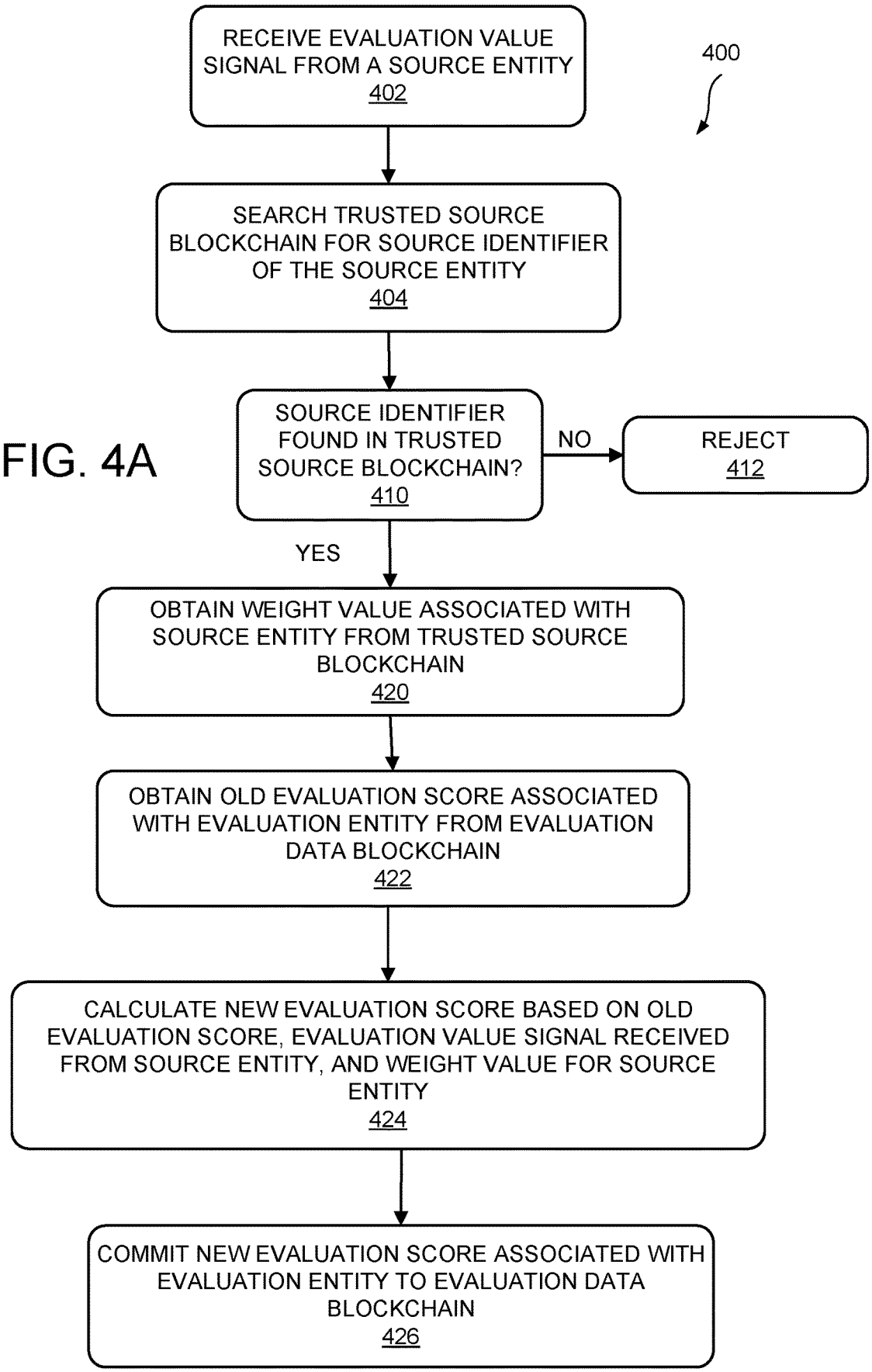
FIG. 4A is a control flow diagram showing an illustrative example of a process for validating a source entity, calculating a new evaluation score based on an old evaluation score, an evaluation value signal received from the source entity, and a weight assigned to the source entity and securing the new evaluation score on the evaluation data blockchain.

FIG. 4A is a control flow diagram showing an illustrative example of a process 400 for adding evaluation data to an evaluation data blockchain in accordance with an aspect of the present approach. This example involves validating a source entity, calculating a new evaluation score based on an old evaluation score, an evaluation value signal received from the source entity, and a weight value assigned to the source entity and securing the new evaluation score on an evaluation data blockchain such as evaluation data blockchain 150 in FIG. 1 and evaluation data blockchain 350 in FIG. 3A.

At 402, an evaluation value signal is received from a source entity, such as the evaluation signal 302 from client/server 120A in FIG. 3A. At 404, a trusted source data blockchain, such as trusted source blockchain 140 in FIG. 1, trusted source blockchain 200 in FIG. 2A or trusted source blockchain 250 in FIG. 2B, is searched to determine whether there is an entry identifying the source entity as a trusted source. If no entry in the trusted source blockchain identifies the source entity as a trusted source, then, at 410, control branches to 412 where the evaluation signal from the source entity is rejected. Thus, a source entity that is not identified as a trusted source is prevented from providing evaluation data.

If an entry is found in the trusted source blockchain for the source entity, e.g. (source1, weight1), then control branches at 410 to 420, where the weight value associated with the source entity in the trusted source blockchain is obtained. Note that this operation can be combined with the search operation 404 in some implementations where the entry for the source in the trusted source blockchain is obtained and includes the corresponding weight value.

At 422, the pre-existing evaluation score, e.g. the Score value in evaluation data blockchain 350 in FIG. 3A, for the entity under evaluation is obtained from the evaluation data blockchain. In other words, the old Score value from the most recent evaluation data block in the evaluation data blockchain is obtained. At 424, a new evaluation score is calculated based on the pre-existing evaluation score, the evaluation value signal received from the source entity, and the weight value for the source entity.

For example, utilizing the example of FIG. 3A, when client/server 120A tries to create evaluation data block 352B with evaluation value1, the distributed blockchain platform performs process 400. An entry is found in the trusted source blockchain for (source1, weight1). A new evaluation score is calculated based on the old pre-existing evaluation score from genesis data block 352A, evaluation signal1, and weight1 and the new evaluation score is saved in evaluation data block 352B, which is committed to the evaluation data blockchain.

Similarly, when client/server 120B tries to create evaluation data block 352C with evaluation value2, the distributed blockchain platform again performs process 400. An entry is found in the trusted source blockchain for (source2, weight2). A new evaluation score is calculated based on the old pre-existing evaluation score from evaluation data block 352B, evaluation signal2, and weight2 and the new evaluation score is saved in evaluation data block 352C, which is committed to the evaluation data blockchain.

Figure 4B:
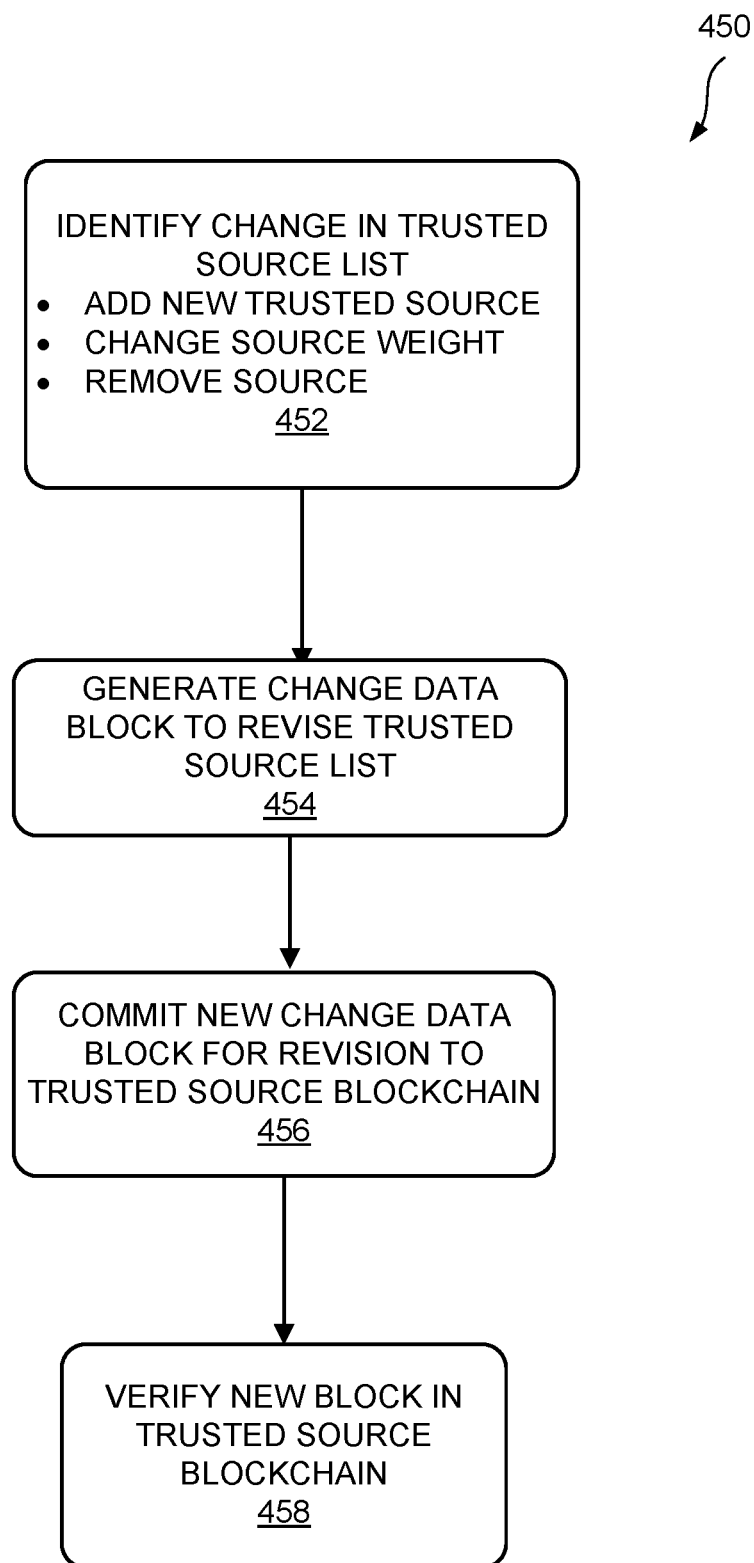
FIG. 4B is a control flow diagram showing an illustrative example of a process for revising a trusted source list and securing the revisions to the trusted source list on the trusted source blockchain.

FIG. 4B is a control flow diagram showing an illustrative example of a process 450 for revising a trusted source list and securing the revisions to the trusted source list on the trusted source blockchain. The operations of process 450 can, for example, be performed by evaluation initiator server 110. In one example, an initiator entity, such as the entity in control of evaluation initiator server 110, that creates the rusted source blockchain retains sole control over the blockchain. The initiator entity, therefore, maintains control over the trusted source list. Examples of initiator entities can include manufacturers of products, creators of documents, or service providers.

At 452, a change is identified in a trusted source list secured on a blockchain, such as the trusted source blockchains illustrated in FIGS. 1, 2A and 2B. Examples of changes to the trusted source list include the addition or removal of a source and changing a weight value associated with a source. At 454, the trusted source list is revised by, for example, generating a change data block that documents just the changes to the trust source list, such as the change data blocks 210 in FIG. 2A, or generating a change data block that documents all or part of the trusted source list, such as the change data blocks 260 in FIG. 2B. At 456, the change data block generated at 454 is committed to the trusted source blockchain and, at 458, the distributed blockchain platform verifies the new change data block.

Figure 4C:
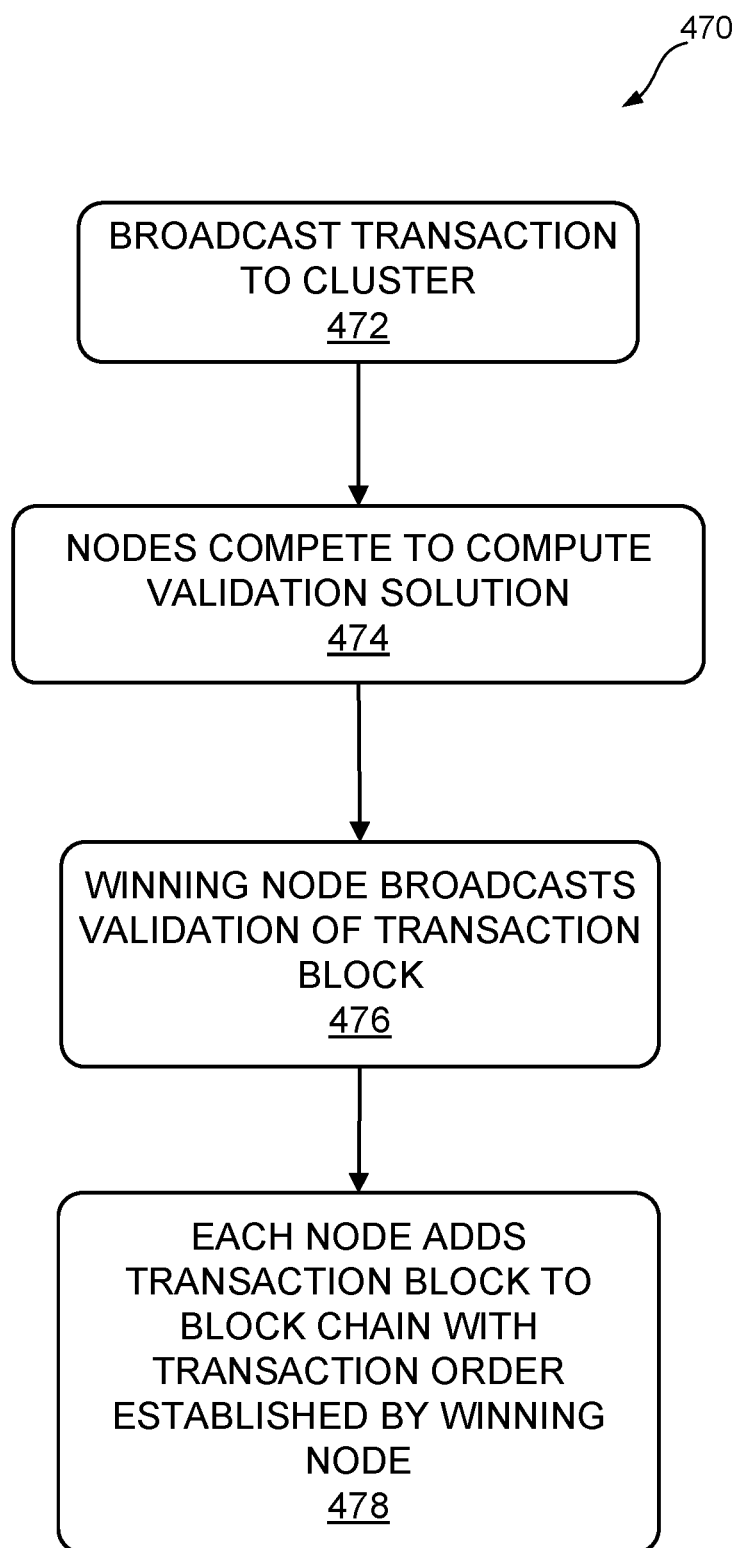
FIG. 4C is a control flow diagram illustrating an example of a validation process for blocks added to the trusted source and evaluation data blockchain ledgers distributed to untrusted nodes.

FIG. 4C is a control flow diagram illustrating an example of a validation process 470 for blocks added to the trusted source and evaluation data blockchain ledgers distributed to untrusted nodes. In process 470, when a change block 142 is created for a trusted source blockchain 140 transaction or an evaluation data block 152 is created for an evaluation data blockchain 150 transaction, the transaction is broadcast, at 472, to the cluster of untrusted nodes. At 474, nodes compete to compute a validation solution for the transaction. At 476, a winning node broadcasts the validation solution for the transaction block and adds the transaction block to its copy of the trusted source or evaluation data blockchain ledger. At 478, in response to the winning node's broadcast, the other nodes add the transaction block to their copies of the trusted source or evaluation data blockchain ledger in the transaction order established by the winning node. The decentralized validation protocol can maintain the integrity and security of the trusted source and evaluation data blockchain ledgers.

The disclosed technology is useful for many real-world scenarios. For example, evaluation initiator server 110 may be controlled or operated by an aircraft manufacturer and an evaluation data blockchain may be utilized by the aircraft manufacturer to maintain evaluation data for a specific aircraft assembly.

In this example scenario, using the data diagram example of FIG. 3, the aircraft manufacturer may define several different trusted sources to permit these sources to provide evaluation data for the aircraft assembly. Identifiers or accounts for one or more of a customer's technicians certified by the manufacturer are defined and assigned a weight value of 1, e.g. (source1, weight=1). One or more of the manufacturer's own technicians are defined and assigned a weight value of 2, e.g. (source2, weight=2). A lead engineer is defined and assigned a weight value of 4, e.g. (source3, weight=4). And a Federal Aviation Administration ("FAA") inspector is defined and assigned a weight value of 6, e.g. (source4, weight=6). This data is stored in the trusted source blockchain 140 using evaluation initiator server 110.

When the manufacturer releases the aircraft assembly, evaluation initiator server 110 creates genesis block 352A to establish evaluation data blockchain 350 for the assembly and defines an initial Score of 10. When the aircraft assembly is received by the customer, one of the customer's certified technicians observes several defects and submits evaluation value1 for evaluation data block 352B. The certified technician is defined in the trusted source blockchain 140 as source1 and the certified technician's evaluation value1 and weight=1 are used calculate a new Score value of 6 and evaluation data block 152B is committed to evaluation data blockchain 150 with Score=6.

The data stored on evaluation data blockchain 150 can be observed and monitored by the manufacturer. When the manufacturer observes the lowered Score value for the aircraft assembly, it dispatches one of its technicians to perform repairs. Upon completion of repairs to the aircraft assembly, the manufacturer's technician submits evaluation value2 for evaluation data block 352C. The manufacturer's technician is defined in the trusted source blockchain 140 as source2 and the certified technician's evaluation value2 and weight=2 are used calculate a new Score value of 8 and evaluation data block 152C is committed to evaluation data blockchain 150.

Similarly, the lead engineer may inspect the aircraft assembly and submit an evaluation value to the evaluation data blockchain 350, which will be more influential on the Score due to the lead engineer's higher weight=4 assignment. For example, the lead engineer may submit an evaluation signal leading to a higher score because the problems identified by the customer's technician have been cleared or submit an evaluation signal leading to a lower score because a design defect is detected.

Likewise, the FAA inspector may inspect the aircraft assembly and submit an evaluation value to the evaluation data blockchain 350. Because the FAA inspector has the authority to approve or reject the aircraft assembly for flight use, they are given the highest weighting value. The FAA inspector may submit an evaluation signal leading to much lower Score value if the aircraft assembly is rejected. Conversely, if the FAA inspector approves the assembly for flight, they may submit an evaluation signal leading to a higher Score indicating flight worthiness.

Access to the content of the trusted source blockchain or the evaluation data blockchain may be handled in a variety of ways. For maximum transparency, the blockchains may be initiated on a public blockchain with the data being available to any person who can access the blockchain. Or the blockchains may be configured to encrypt the data and restrict access so that the data is tightly controlled. For example, only entities identified in the trusted source blockchain may access the blockchains. Yet another alternative is to have one blockchain openly available and the other blockchain restricted. For example, the evaluation data blockchain is publicly accessible, but the trusted source blockchain is restricted.

In another example scenario, the evaluation initiator server 110 may be controlled or operated by an automobile or automobile part manufacturer and an evaluation data blockchain may be utilized by the manufacturer to maintain evaluation data for a specific automobile or part. Similar to the aircraft example above, the manufacturer defines trusted sources that are permitted to provide evaluation data along with relative weights. A technician may have a relatively low weight, e.g. weight=2, while a transfer entity, such as a state motor vehicle registration department or a law enforcement organization, may have a relatively high weight.

In still another example, the evaluation initiator server 110 may be controlled or operated by service provider and an evaluation data blockchain may be utilized by the service provider to maintain evaluation data for a specific service or a entity providing the service. Similar to the examples above, the service provider defines trusted sources that are permitted to provide evaluation data along with relative weights. Examples of the service include production services, shipping services, maintenance services, and customer services.

In an additional example, the evaluation initiator server 110 may be controlled or operated by a producer or distributor of a commodity or food stuff and an evaluation data blockchain may be utilized by the producer or distributor to maintain evaluation data for a specific lot of the commodity or food stuff. Examples of the commodity or food stuff include oil, minerals, metals, grains, meat, and fruit. Similar to the aircraft example above, the producer or distributor defines trusted sources that are permitted to provide evaluation data along with relative weights. A shipping clerk may have a relatively low weight, e.g. weight=2, receiving entity a medium weight, e.g. weight=4, while a government inspector, such as a state or federal agricultural department, may have a relatively high weight, e.g. weight=10. Also note that the evaluation score value may be range limited, e.g. 1 to 10, such that a high weight trusted source can significantly change the evaluation score with their input.

Depending upon the scripting capabilities of the blockchain platform, the data blocks of the blockchains may include more extensive code execution. For example, an evaluation system directed toward a product may include code in its data blocks that requires a source entity that submits evaluation data to have purchased the product in addition to being defined in the trusted source blockchain.

It should be appreciated that the utilization of blockchain technology, such as scripting technology within smart contracts, in this context provides a high degree of flexibility and variation in the configuration of implementations without departing from the teachings of the present disclosure.

Note that the disclosed technology is not limited to maintaining trusted source or evaluation data. The technology may be applied to secure management of data of many types. For example, the present technology can be configured to maintain a first data set on a first blockchain and maintain a second data set on a second blockchain, where the second blockchain includes a first smart contract having a first script that, when executed, accesses at least part of the first data set on the first blockchain. In this example, adding a new data block to the second blockchain to modify the second data set causes the first script of the first smart contract to execute and access the first data set. The new data block can be securely committed the second blockchain.

In certain examples, the first script of the first smart contract, when executed, performs a validation operation on the new data block using the first data set and, if the validation operation fails, rejects the new data block.

In one feature of certain examples of the disclosed technology, data from one blockchain can be utilized in determining the data in the other blockchain. For example, the first smart contract includes a second script that, when executed, accesses a first data value of the first data set on the first blockchain, calculates a new data value for the second data set based at least in part on the first data value of the first data set, and, if the validation operation succeeds, includes the new data value for the second data set in the new data block and adds the new data block to the second blockchain. In another example, the first script, when executed, accesses a first data value of the first data set on the first blockchain, calculates a new data value for the second data set based at least in part on the first data value of the first data set, and includes the new data value for the second data set in the new data block and adds the new data block to the second blockchain Another feature of some examples of the disclosed technology can be the two-way use of data from the two blockchains to determine the data in each blockchain. For example, the first blockchain includes a second smart contract having a script that, when executed, accesses the new data value for the second data set in the new data block on the second blockchain, calculates a new data value for the first data set based at least in part on the new data value of the first data set, and adds a new data block to the first blockchain that includes the new data value for the first data set.

In certain examples of the disclosed technology, the first blockchain includes a second smart contract having a script that, when executed, accesses a data value of the second data set on the second blockchain, calculates a new data value for the first data set based at least in part on the first data value of the first data set, and adds a new data block to the first blockchain that includes the new data value for the first data set. In some examples, the first blockchain employs a first scripting language and the second blockchain employs a second scripting language, the first scripting language different than the second scripting language.

Figure 5:
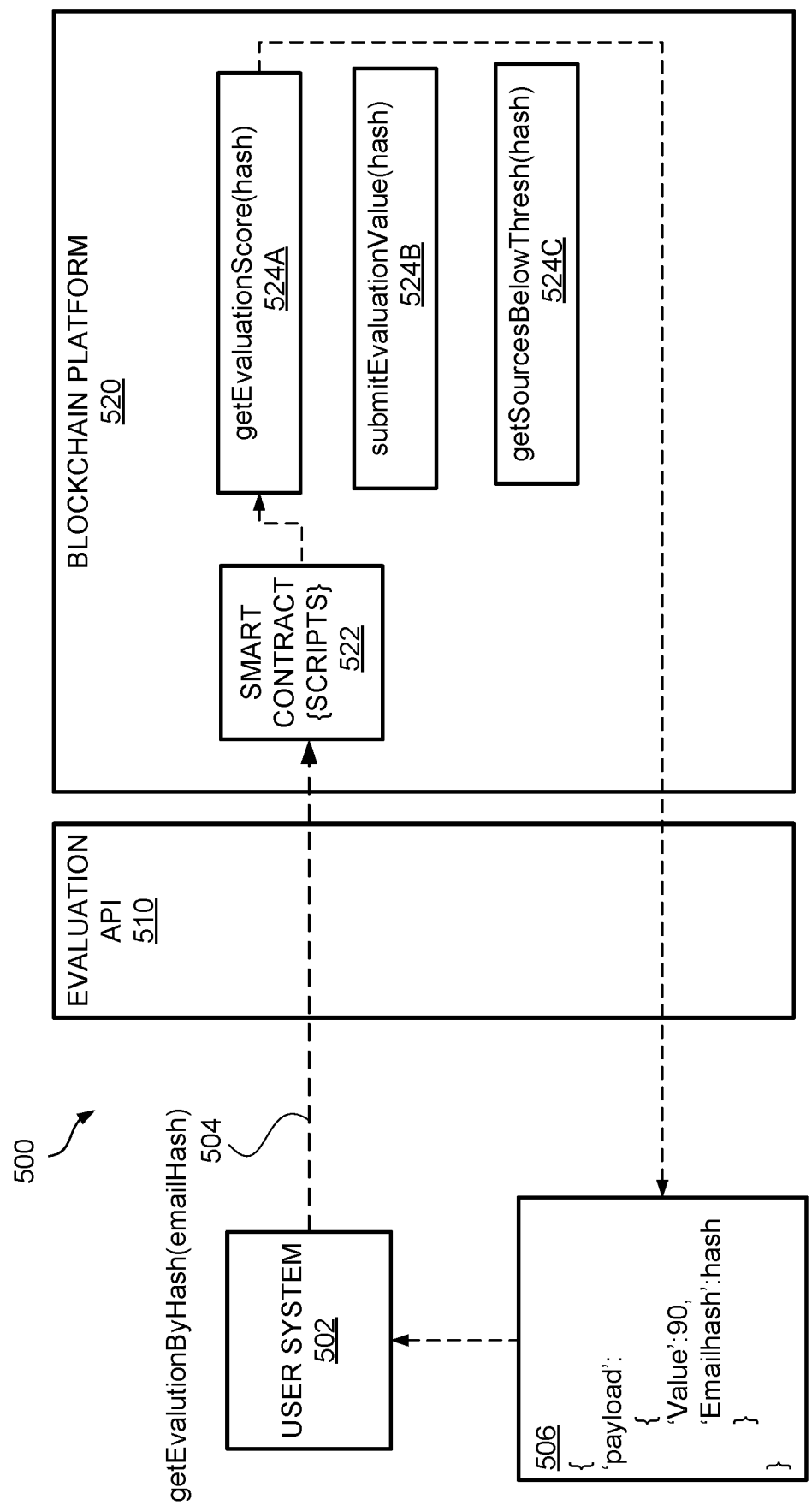
FIG. 5 is a data architecture diagram showing an illustrative example of a user accessing information from the evaluation data blockchain using an application programming interface.

FIG. 5 is a data architecture diagram showing an illustrative example of a user accessing information from the evaluation data blockchain 350. In this example, an evaluation Application Program Interface (API) 510 provides an interface to the blockchain platform 520 that supports the evaluation data blockchain. The blockchain platform 520 supports smart contract 522, which includes scripts 524 with code that, when executed by the blockchain platform 520, performs operations with respect to the evaluation data blockchain.

In the example of FIG. 5, three scripts are defined in smart contract 522. The getEvaluationScore script 524A provides the capability for a user to query the evaluation data blockchain 350 for a current Score value for an entity for which the blockchain maintains evaluation data. The submitEvaluationInputValue script 524B provides the capability for a user to submit an evaluation value to the evaluation data blockchain 350 as described with respect to evaluation data block 352 of FIG. 3B. And the getSourcesBelowThreshold script 524C provides the capability for a user to query the evaluation data blockchain 350 for the sources who submitted evaluation input values that were below a certain threshold. The scripts 524 shown are merely examples and many other different or additional scripts can be defined using the capability of the executable scripts in smart contract 522 as provided for on blockchain platform 520.

FIG. 5 shows a user system 502 submitting a request 504 for getEvaluationByHash(emailHash) to API 510. API 510 invokes smart contract 522 causing blockchain platform 520 to execute the getEvaluationScore script 524A to search the evaluation data blockchain 350 for the current Score value. The getEvaluationScore script 524A traverses the evaluation data blockchain 350 to find the current Score value and sends the Score value to user system 502 in an email message 506.

Blockchain Ledger Data Structure

Figure 6A:
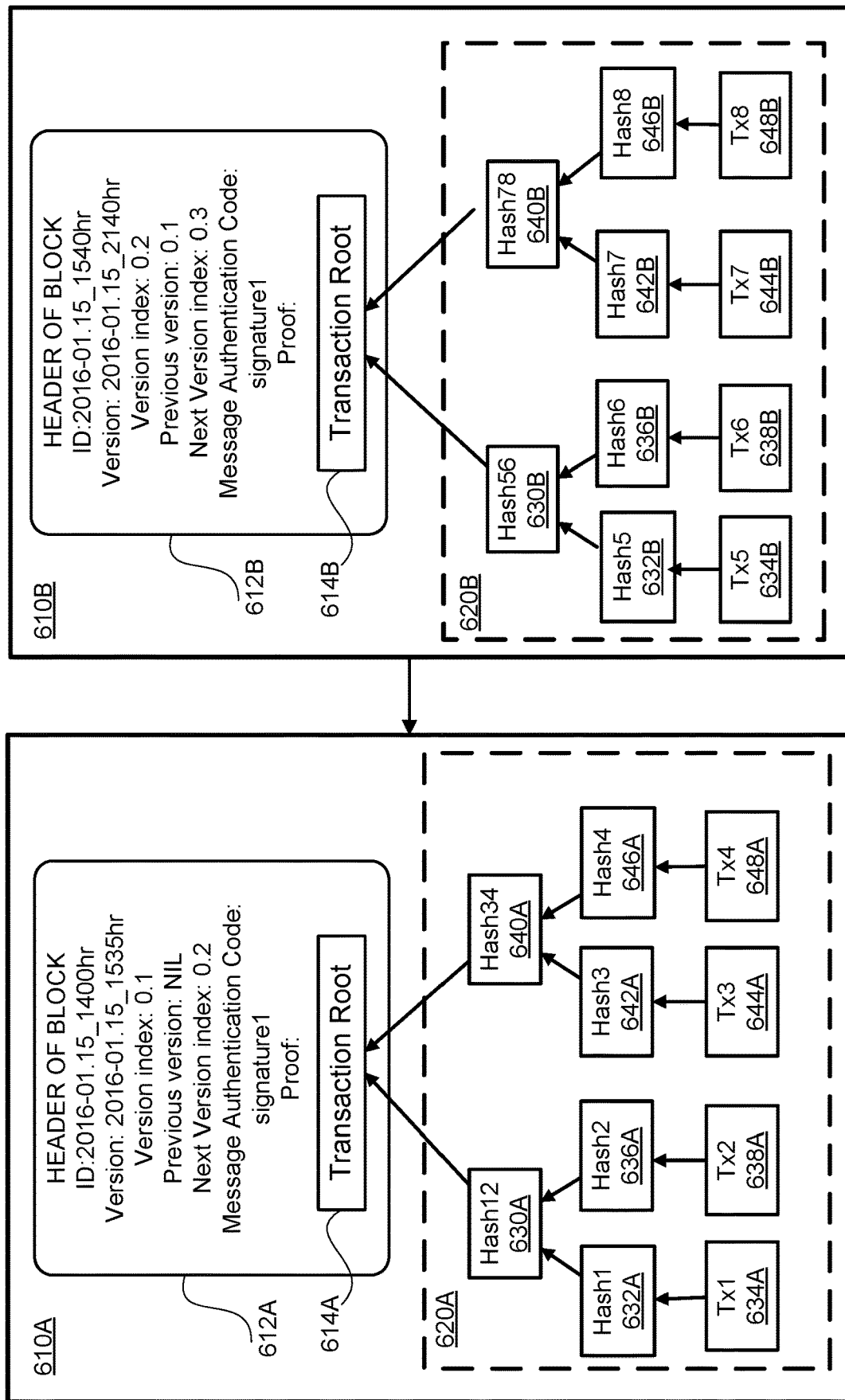
FIG. 6A is a data architecture diagram illustrating a simplified example of a blockchain ledger based on the blocks of the trusted source ledger or the blocks of the evaluation data blockchain of FIG. 1.

FIG. 6A is a data architecture diagram illustrating a simplified example of a blockchain ledger 600 based on the blocks 142A-E of the trusted source ledger 140 or the blocks 152A-E of the evaluation data blockchain 150 of FIG. 1. The blockchain ledger 600 example of FIG. 6A is simplified to show block headers, metadata and signatures of blocks 210A-E in order to demonstrate a traceable secure key ledger using a blockchain. In outline, a blockchain ledger may be a globally shared transactional database.

FIG. 6A is an illustrative example of a blockchain ledger 600 with a data tree holding transaction data that is verified using cryptographic techniques. In FIG. 6A, each block 610 includes a block header 612 with information regarding previous and subsequent blocks and stores a transaction root node 614 to a data tree 620 holding transactional data. Transaction data may store smart contracts, data related to transactions, or any other data. The elements of smart contracts may also be stored within transaction nodes of the blocks.

In the example of FIG. 6A, a Merkle tree 620 is used to cryptographically secure the transaction data. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
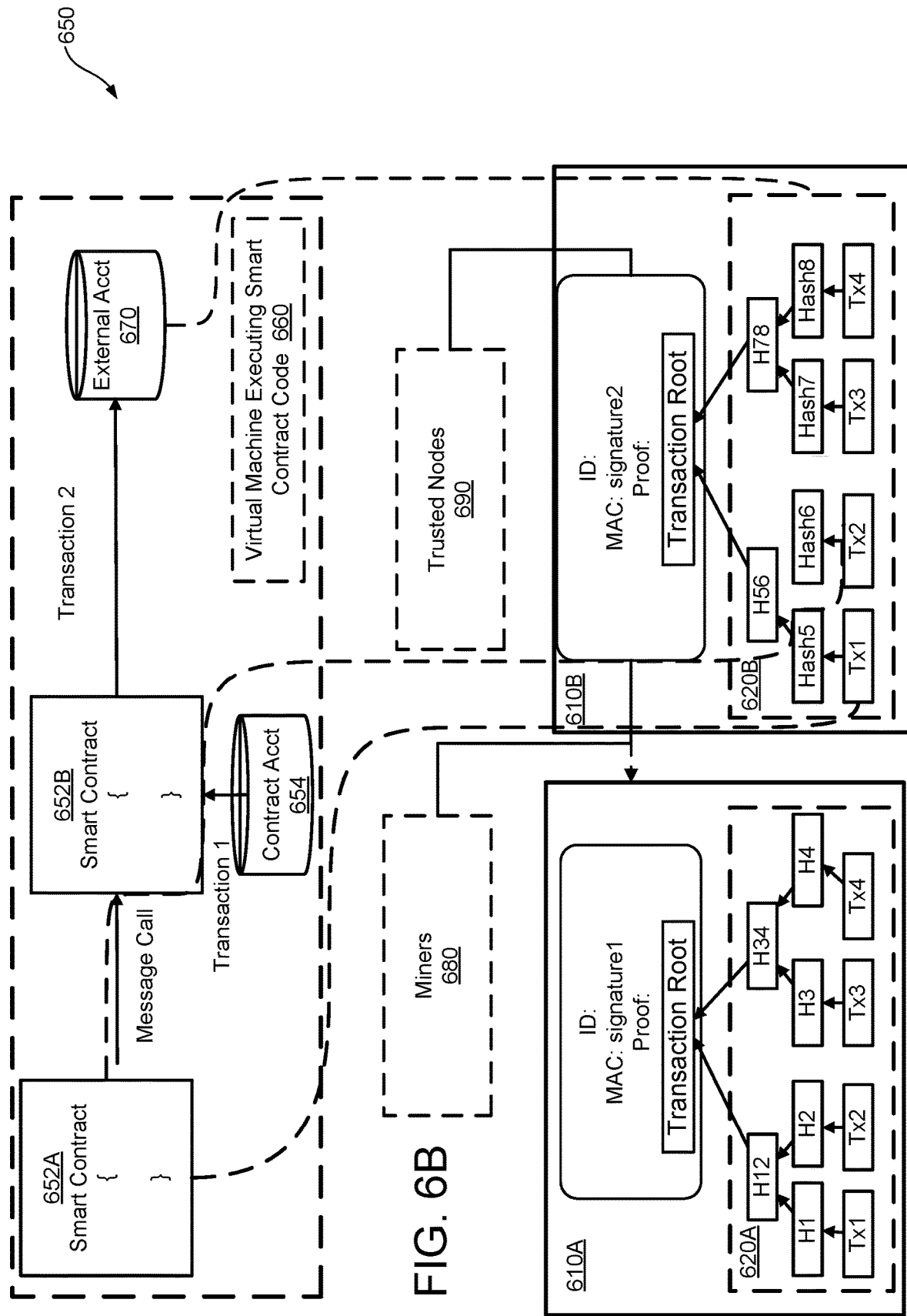
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 652 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 652 are executed in a virtual machine environment, although this is optional.

In FIG. 6B, the aspects of smart contracts 652 are stored in transaction data nodes in data tree 620 in the blocks 610 of the blockchain ledger of FIG. 6A. In the example of FIG. 6B, Smart Contract 652A is stored in data block Tx1 node 634A of data tree 620A in block 610A, Smart Contract 652B is stored in Tx2 node 638A, Contract Account 654 associated with Smart Contract 652B is stored in Tx3 node 644A, and External Account is stored in Tx4 node 648A.

Storage of Smart Contracts and Transaction Data in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates transaction data, the transaction data must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process is determined by a centralized control of a cluster of trusted nodes. In this case, the centralized control may be a trusted node, such as evaluation initiator server 110, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a change data block 142 for trusted source blockchain 140 or an evaluation data block 152 for evaluation data blockchain 150, the block is an unconfirmed and unidentified entity. To be part of the acknowledged "currency", it may be added to the blockchain, and therefore relates to the concept of a trusted cluster.

In a trusted cluster, when a change data block 142 or evaluation data block 152 is added, every node competes to acknowledge the next "transaction" (e.g. a change to the trusted source list or an added evaluation value input from a trusted source). In one example, the nodes compete to mine and get the lowest hash value: min{previous_hash, contents_hash, random_nonce_to_be_guessed}→result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to trusted sources or evaluation data, may also be ciphered for restricted access so that the meta-data does not disclose information pertaining to the trusted source list or the evaluation score.

The mining process, such as may be used in concert with the validation process 470 of FIG. 4C, may be utilized to deter double accounting, overriding or replaying attacks, with the community arrangement on the agreement based on the "good faith" that no single node can control the entire cluster. The working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast to the network using software. Mining nodes validate transactions, add them to the block they are building, and then broadcast the completed block to other nodes.

Note that in a restricted network, stake-holders who are authorized to check or mine for the trusted source list or evaluation data may or may not access the transaction blocks themselves, but would need to have keys to the meta-data (since they are members of the restricted network, and are trusted) to get the details. As keys are applied on data with different data classifications, the stake-holders can be segmented.

A decentralized blockchain may also use ad-hoc secure message passing and distributed networking. In this example, the transaction blockchain or evaluation data blockchain ledgers may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the trusted source list as centrally authorized and kept offline.

In some examples, access to a distributed trusted source blockchain or an evaluation data blockchain ledger may be restricted by cryptographic means to be only open to authorized servers. Since one or both of the blockchain ledgers are distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving a traceable key block-chain ledger. The specific examples of different aspects of a traceable key block-chain ledger described herein are illustrative and are not intended to limit the scope of the techniques shown.

Smart Contracts

Smart contracts are defined by code. As described previously, the terms and conditions of the smart contract may be encoded (e.g., by hash) into a block-chain ledger. Specifically, smart contracts may be compiled into a bytecode (if executed in a virtual machine), and then the bytecode may be stored in a block-chain ledger as described previously. Similarly, transaction data executed and generated by smart contracts may be stored in the block-chain ledger in the ways previously described.

Computer Architectures for Use of Smart Contracts and Blockchain Ledgers

Note that at least parts of processes 400, 450 and 470 of FIGS. 4A, 4B and 4C, the scripts of evaluation data block 352 of FIG. 3B, smart contract 522 of FIG. 5, smart contracts 652 of FIG. 6B, and other processes and operations pertaining to trusted source and evaluation data blockchain ledgers described herein may be implemented in one or more servers, such as computer environment 800 in FIG. 8, or the cloud, and data defining the results of user control input signals translated or interpreted as discussed herein may be communicated to a user device for display. Alternatively, the trusted source and evaluation data blockchain ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 450 and 470 of FIGS. 4A, 4B and 4C, the scripts of evaluation data block 352 of FIG. 3B, smart contract 522 of FIG. 5, smart contracts 652 of FIG. 6B) are described herein as being implemented, at least in part, by an application, component, and/or circuit. Although the following illustration refers to the components of FIGS. 3B, 4A, 4B, 4C, 5 and 6B, 1, 5, 6 and 7, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 450 and 470 of FIGS. 4A, 4B and 4C, the scripts of evaluation data block 352 of FIG. 3B, smart contract 522 of FIG. 5, smart contracts 652 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

FIG. 7 shows additional details of an example computer architecture 700 for a computer, such as the servers 110 and 120A-C (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as a copy of trusted source blockchain data 720 or evaluation blockchain data 730), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for a trusted source blockchain or an evaluation data blockchain ledger. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 556, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for trusted source and evaluation data blockchain ledgers. It should be understood that this configuration is illustrative only and should not be construed as being limiting in any way.

According to various implementations, the application servers 808 also include one or more key management services 818, evaluation data management services 820, and one or more blockchain services 822. The trusted source management services 818 can include services for managing a trusted source list on a trusted source blockchain, such as trusted source blockchain 140 in FIG. 1. The evaluation data management services 820 can include services for managing evaluation data on evaluation data blockchain, such as evaluation data blockchain 150 in FIG. 1. The blockchain services 822 can include services for participating in management of one or more blockchains, such as by creating genesis blocks, transaction blocks, and performing validation.

As shown in FIG. 8, the application servers 808 also can host other services, applications, portals, and/or other resources ("other resources") 824. The other resources 824 can include, but are not limited to, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for a trusted source blockchain or an evaluation data blockchain. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting trusted source and evaluation data blockchain ledgers, among other aspects.

Turning now to FIG. 9, an illustrative computing device architecture 900 for a computing device that is capable of executing various software components is described herein for trusted source and evaluation data blockchain ledgers. The computing device architecture 900 is applicable to computing devices that can manage trusted source and evaluation data blockchain ledgers. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the servers 110 and 120A-C shown in FIG. 1 and computing device 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSOFT AZURE from Microsoft Corporation of Redmond, Wash. or AWS from Amazon Corporation of Seattle, Wash. The operating system may also include WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, MAC OS or IOS from Apple Inc. of Cupertino, Calif., and ANDROID OS from Google Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

EXAMPLES OF VARIOUS IMPLEMENTATIONS

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following examples:

Example 1: A computer-implemented method for secure management of evaluation data, the method comprising: receiving an evaluation value signal from a source entity, the evaluation value signal relating to an evaluation entity having an evaluation score secured on an evaluation data blockchain; verifying whether the source entity is identified in trusted source data; if the source entity is identified in trusted source data: obtaining a weight associated with the source entity, obtaining the evaluation score for the evaluation entity from a first evaluation data block in the evaluation data blockchain, where the first evaluation data block is a most recent evaluation data block in the evaluation data blockchain, calculating a new evaluation score based on the evaluation score obtained from the first evaluation data block and the received valuation signal weighted according to the weight associated with the source entity, and securely committing the new evaluation score to the evaluation data blockchain in another evaluation data block.

Example 2: The computer-implemented method of Example 1, where the method includes: defining entries for one or more source entities in trusted source data secured on a trusted source blockchain, the trusted source blockchain different than the evaluation data blockchain, where a weight is associated with each source entity in the entry for each source entity; verifying whether the source entity is identified in trusted source data comprises searching the trusted source blockchain for an entry corresponding to the source entity; and obtaining a weight associated with the source entity comprises obtaining a weight associated with the source entity from the entry corresponding to the source entity.

Example 3: The computer-implemented method of Example 2, where the method includes: defining another entry for another source entity in a change data block and committing the change data block to the trust source blockchain.

Example 4: The computer-implemented method of Example 2, where the method includes: modifying one of the entries for the one or more source entities on a trusted source blockchain in a change data block and committing the change data block to the trust source blockchain.

Example 5: The computer-implemented method of Example 2, where each of the first when executed, performs the step of searching the trusted source blockchain for an entry corresponding to the source entity.

Example 6: The computer-implemented method of Example 5, where each of the first and second evaluation data blocks includes a second executable script that, when executed, performs the step of calculating a new evaluation score based on the evaluation score obtained from the first evaluation data block and the received valuation signal weighted according to the weight associated with the source entity.

Example 7: The computer-implemented method of Example 2, where: a first entry for a first source entity of the one or more source entities defines the first source entity with a first weight; a second entry for a second source entity of the one or more source entities defines the second source entity with a second weight; and the first weight is greater than the second weight.

Example 8: The computer-implemented method of Example 2, where the trusted source blockchain employs a first scripting language and the evaluation data blockchain employs a second scripting language, the first scripting language different than the second scripting language.

Example 9: A system for secure management of evaluation data, the system comprising: one or more processors; and one or more memory devices in communication with the one or more processors, the memory devices having computer-readable instructions stored thereupon that, when executed by the processors, cause the processors to: receive an evaluation value signal from a source entity, the evaluation value signal relating to an evaluation entity having an evaluation score secured on an evaluation data blockchain; verify whether the source entity is identified in trusted source data; if the source entity is identified in trusted source data: obtain a weight associated with the source entity, obtain the evaluation score for the evaluation entity from a first evaluation data block in the evaluation data blockchain, where the first evaluation data block is a most recent evaluation data block in the evaluation data blockchain, calculate new evaluation score based on the evaluation score obtained from the first evaluation data block and the received valuation signal weighted according to the weight associated with the source entity, and securely commit the new evaluation score to the evaluation data blockchain in another evaluation data block.

Example 10: The system of Example 9, where the system is configured to: define entries for one or more source entities in trusted source data secured on a trusted source blockchain, the trusted source blockchain different than the evaluation data blockchain, where a weight is associated with each source entity in the entry for each source entity; and verify whether the source entity is identified in trusted source data comprises searching the trusted source blockchain for an entry corresponding to the source entity; and obtain a weight associated with the source entity comprises obtaining a weight associated with the source entity from the entry corresponding to the source entity.

Example 11: The system of Example 10, where the system is configured to operate to: define another entry for another source entity in a change data block and committing the change data block to the trust source blockchain.

Example 12: The system of Example 10, where the system is configured to operate to: modify one of the entries for the one or more source entities on a trusted source blockchain in a change data block and committing the change data block to the trust source blockchain.

Example 13: The system of Example 10, where: each of the first and second evaluation data blocks includes a first executable script that, when executed, performs the step of searching the trusted source blockchain for an entry corresponding to the source entity; and each of the first and second evaluation data blocks includes a second executable script that, when executed, performs the step of calculating a new evaluation score based on the evaluation score obtained from the first evaluation data block and the received valuation signal weighted according to the weight associated with the source entity.

Example 14: The system of Example 10, where the trusted source blockchain employs a first scripting language and the evaluation data blockchain employs a second scripting language, the first scripting language different than the second scripting language.

Example 15. A computer storage medium having computer executable instructions stored thereon which, when executed by one or more processors, cause the processors to execute a key management method comprising: receiving an evaluation value signal from a source entity, the evaluation value signal relating to an evaluation entity having an evaluation score secured on an evaluation data blockchain; verifying whether the source entity is identified in trusted source data; if the source entity is identified in trusted source data: obtaining a weight associated with the source entity, obtaining the evaluation score for the evaluation entity from a first evaluation data block in the evaluation data blockchain, where the first evaluation data block is a most recent evaluation data block in the evaluation data blockchain, calculating a new evaluation score based on the evaluation score obtained from the first evaluation data block and the received valuation signal weighted according to the weight associated with the source entity, and securely committing the new evaluation score to the evaluation data blockchain in another evaluation data block.

Example 16. The computer storage medium of Example 15, where the method includes: defining entries for one or more source entities in trusted source data secured on a trusted source blockchain, the trusted source blockchain different than the evaluation data blockchain, where a weight is associated with each source entity in the entry for each source entity; verifying whether the source entity is identified in trusted source data comprises searching the trusted source blockchain for an entry corresponding to the source entity; and obtaining a weight associated with the source entity comprises obtaining a weight associated with the source entity from the entry corresponding to the source entity.

Example 17. The computer storage medium of Example 16, where the method includes: defining another entry for another source entity in a change data block and committing the change data block to the trust source blockchain.

Example 18. The computer storage medium of Example 16, where the method includes: modifying one of the entries for the one or more source entities on a trusted source blockchain in a change data block and committing the change data block to the trust source blockchain.

Example 19. The computer storage medium of Example 16, where each of the first and second evaluation data blocks includes a first executable script that, when executed, performs the step of searching the trusted source blockchain for an entry corresponding to the source entity.

Example 20. The computer storage medium of Example 16, where each of the first and second evaluation data blocks includes a second executable script that, when executed, performs the step of calculating a new evaluation score based on the evaluation score obtained from the first evaluation data block and the received valuation signal weighted according to the weight associated with the source entity.

Example 21: A computer-implemented method, system or computer readable media having instructions stored thereon for secure management of data, the method comprising: maintaining a first data set on a first blockchain, maintaining a second data set on a second blockchain, the second blockchain including a first smart contract having a first script that, when executed, accesses at least part of the first data set on the first blockchain, adding a new data block to the second blockchain to modify the second data set, where adding the new data block causes the first script of the first smart contract to execute and access the first data set, and securely committing the new data block to the second blockchain.

Example 22: The computer-implemented method, system or media of Example 21, where the first script of the first smart contract, when executed, performs a validation operation on the new data block using the first data set and, if the validation operation fails, rejects the new data block.

Example 23: The computer-implemented method, system or media of Example 22, where the first smart contract includes a second script that, when executed, accesses a first data value of the first data set on the first blockchain, calculates a new data value for the second data set based at least in part on the first data value of the first data set, and, if the validation operation succeeds, includes the new data value for the second data set in the new data block and adds the new data block to the second blockchain.

Example 24: The computer-implemented method, system or media of Example 23, where the first blockchain includes a second smart contract having a script that, when executed, accesses the new data value for the second data set in the new data block on the second blockchain, calculates a new data value for the first data set based at least in part on the new data value of the first data set, and adds a new data block to the first blockchain that includes the new data value for the first data set.

Example 25: The computer-implemented method, system or media of Example 21, where the first script, when executed, accesses a first data value of the first data set on the first blockchain, calculates a new data value for the second data set based at least in part on the first data value of the first data set, and includes the new data value for the second data set in the new data block and adds the new data block to the second blockchain.

Example 26: The computer-implemented method, system or media of Example 21, where the first blockchain includes a second smart contract having a script that, when executed, accesses a data value of the second data set on the second blockchain, calculates a new data value for the first data set based at least in part on the first data value of the first data set, and adds a new data block to the first blockchain that includes the new data value for the first data set.

Example 27: The computer-implemented method, system or media of Example 26, where the first blockchain employs a first scripting language and the second blockchain employs a second scripting language, the first scripting language different than the second scripting language.

What is claimed is:

1. A computer-implemented method for secure management of evaluation data, the method comprising:
receiving an evaluation value from a source entity, the evaluation value relating to an evaluation entity;
defining entries for one or more source entities listed in trusted source data secured in one or more data blocks on a blockchain, wherein each entry for the one or more source entities in the trusted source data secured in the one or more data blocks on the blockchain includes a weight value for a corresponding source entity;

searching the trusted source data secured in the one or more data blocks on the blockchain for an entry corresponding to the source entity; and based on finding the entry corresponding to the source entity in the trusted source data:

obtaining an evaluation score for the evaluation entity from the blockchain, the evaluation score previously calculated based on one or more previous evaluation values for the evaluation entity, calculating a new evaluation score for the evaluation entity using the evaluation score and the evaluation value, wherein the new evaluation score for the evaluation entity is calculated based on the evaluation value weighted according to a weight value corresponding to the source entity obtained from the entry corresponding to the source entity, and securely committing the new evaluation score for the evaluation entity to a new data block on the blockchain.

2. The computer-implemented method of claim 1, wherein the method further comprises:

defining another entry for another source entity in a further data block, where the another entry includes a weight value for the another source entity, and committing the further data block to the blockchain.

3. The computer-implemented method of claim 1, wherein the method further comprises:

providing a modified weight value for a particular one of the one or more source entities in a further data block and committing the further data block to the blockchain.

4. The computer-implemented method of claim 1, wherein the method further comprises:

defining another entry for another source entity in a further data block and committing the further data block to the blockchain.

5. The computer-implemented method of claim 1, wherein the method further comprises:

providing a modified entry for particular one of the one or more source entities in a further data block and committing the further data block to the blockchain.

6. The computer-implemented method of claim 1, wherein at least one of the one or more data blocks on the blockchain includes at least one selected from the following:

a first executable script that, when executed, performs the step of searching the trusted source data for the entry corresponding to the source entity; and a second executable script that, when executed, performs the steps of calculating the new evaluation score, and securely committing the new evaluation score to the new data block on the blockchain.

7. A system for secure management of evaluation data, the system comprising:

one or more processors; and one or more memory devices in communication with the one or more processors, the memory devices having computer-readable instructions stored thereupon that, when executed by the processors, cause the processors to perform operations comprising:

receiving an evaluation value from a source entity, the evaluation value relating to an evaluation entity;

defining entries for one or more source entities listed in trusted source data secured in one or more data blocks on a blockchain, wherein each entry for the one or more source entities in the trusted source data secured in the one or more data blocks on the blockchain includes a weight value for a corresponding source entity;

searching the trusted source data secured in the one or more data blocks on the blockchain for an entry corresponding to the source entity; and based on finding the entry corresponding to the source entity is found in the trusted source data:

obtaining an evaluation score for the evaluation entity from the blockchain, the evaluation score previously calculated based on one or more previous evaluation values for the evaluation entity, calculating a new evaluation score for the evaluation entity using the evaluation score and the evaluation value, wherein the new evaluation score for the evaluation entity is calculated based on the evaluation value weighted according to a weight value corresponding to the source entity obtained from the entry corresponding to the source entity, and securely committing the new evaluation score for the evaluation entity to a new data block on the blockchain.

8. The system of claim 7, wherein the operations further comprise:

defining another entry for another source entity in a further data block, where the another entry includes a weight value for the another source entity, and committing the further data block to the blockchain.

9. The system of claim 7, wherein the operations further comprise:

providing a modified weight value for a particular one of the one or more source entities in a further data block and committing the further data block to the blockchain.

10. The system of claim 7, wherein the operations further comprise:

defining another entry for another source entity in a further data block and committing the further data block to the blockchain.

11. The system of claim 7, wherein the operations further comprise:

providing a modified entry for particular one of the one or more source entities in a further data block and committing the further data block to the blockchain.

12. The system of claim 7, wherein at least one of the one or more data blocks on the blockchain includes at least one selected from the following:

a first executable script that, when executed, performs the step of searching the trusted source data for the entry corresponding to the source entity; and a second executable script that, when executed, performs the steps of calculating the new evaluation score, and securely committing the new evaluation score to the new data block on the blockchain.

13. A computer storage medium having computer executable instructions stored thereon which, when executed by one or more processors, cause the processors to execute operations for secure management of evaluation data comprising:

receiving an evaluation value from a source entity, the evaluation value relating to an evaluation entity;

defining entries for one or more source entities listed in trusted source data secured in one or more data blocks on a blockchain, wherein each entry for the one or more source entities in the trusted source data secured in the one or more data blocks on the blockchain includes a weight value for a corresponding source entity;

searching the trusted source data secured in the one or more data blocks on the blockchain for an entry corresponding to the source entity; and based on finding the entry corresponding to the source entity in the trusted source data:

obtaining an evaluation score for the evaluation entity from the blockchain, the evaluation score previously calculated based on one or more previous evaluation values for the evaluation entity, calculating a new evaluation score for the evaluation entity using the evaluation score and the evaluation value, wherein the new evaluation score for the evaluation entity is calculated based on the evaluation value weighted according to a weight value corresponding to the source entity obtained from the entry corresponding to the source entity, and securely committing the new evaluation score for the evaluation entity to a new data block on the blockchain.

14. The computer storage medium of claim 13, wherein the operations further comprise:

defining another entry for another source entity in a further data block, where the another entry includes a weight value for the another source entity, and committing the further data block to the blockchain.

15. The computer storage medium of claim 13, wherein the operations further comprise:

providing a modified weight value for a particular one of the one or more source entities in a further data block and committing the further data block to the blockchain.

16. The computer storage medium of claim 13, wherein the operations further comprise:

providing a modified entry for particular one of the one or more source entities in a further data block and committing the further data block to the blockchain.

17. The computer storage medium of claim 13, wherein at least one of the one or more data blocks on the blockchain includes at least one selected from the following:

a first executable script that, when executed, performs the step of searching the trusted source data for the entry corresponding to the source entity; and a second executable script that, when executed, performs the steps of calculating the new evaluation score, and securely committing the new evaluation score to the new data block on the blockchain.

* * * * *